United States Patent
Deguchi et al.

(10) Patent No.: US 9,598,781 B2
(45) Date of Patent: *Mar. 21, 2017

(54) CARBON DIOXIDE REDUCING METHOD, CARBON DIOXIDE REDUCING CELL, AND CARBON DIOXIDE REDUCING APPARATUS

(71) Applicant: Panasonic Corporation, Osaka (JP)

(72) Inventors: Masahiro Deguchi, Osaka (JP); Satoshi Yotsuhashi, Osaka (JP); Hiroshi Hashiba, Osaka (JP); Yuka Yamada, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 274 days.

This patent is subject to a terminal disclaimer.

(21) Appl. No.: 14/280,917

(22) Filed: May 19, 2014

(65) Prior Publication Data

US 2014/0346053 A1    Nov. 27, 2014

(30) Foreign Application Priority Data

May 21, 2013 (JP) ................. 2013-106871
Aug. 2, 2013 (JP) ................. 2013-161586

(51) Int. Cl.
*C25B 3/04* (2006.01)
*C25B 1/00* (2006.01)
*C25B 9/08* (2006.01)

(52) U.S. Cl.
CPC ............. *C25B 3/04* (2013.01); *C25B 1/003* (2013.01); *C25B 9/08* (2013.01); *Y02E 10/542* (2013.01)

(58) Field of Classification Search
CPC ... C25B 3/04; C25B 1/003; C25B 9/08; B01J 35/004; Y02E 10/542

(Continued)

(56) References Cited

U.S. PATENT DOCUMENTS 8,652,989 B2    2/2014  Sato et al.
8,696,883 B2    4/2014  Yotsuhashi et al.
(Continued)

FOREIGN PATENT DOCUMENTS

JP    55-105625    8/1980
JP    4-166076     6/1992
(Continued)

OTHER PUBLICATIONS

Fujii et al, "Photoelectrochemical Properties of the p-n Junction in and near the Surface Depletion Region of n-type GaN," J. Phys. Chem. C 2010, vol. 114, pp. 22727-22735.*

*Primary Examiner* — Keith Hendricks
*Assistant Examiner* — Colleen M Raphael
(74) *Attorney, Agent, or Firm* — Wenderoth, Lind & Ponack, L.L.P.

(57) ABSTRACT

The carbon dioxide reducing method using light includes: (a) preparing a carbon dioxide reducing cell including: a cathode chamber that holds first electrolytic solution containing carbon dioxide; an anode chamber that holds second electrolytic solution; a proton exchange membrane inserted between the cathode and anode chambers; a cathode set inside the cathode chamber to contact the first electrolytic solution, and the cathode having copper, gold, silver, indium, etc. on the cathode; and an anode set inside the anode chamber to contact the second electrolytic solution, the anode having first semiconductor layer constituted by nitride semiconductor including $Al_xGa_{1-x}N$ layer wherein $0 \leq x \leq 0.25$, an n-type GaN layer, and second semiconductor layer constituted by semiconductor having pn junction structure and electrically connected to the first semiconductor layer through p-type semiconductor layer, further to the cathode through no external power source; and (b) irradiat- (Continued)

ing the anode with light to reduce carbon dioxide on the cathode.

20 Claims, 13 Drawing Sheets

(58) Field of Classification Search
USPC .................. 205/340; 204/252; 422/186–187
See application file for complete search history.

(56) References Cited

U.S. PATENT DOCUMENTS

| | | | | |
|---|---|---|---|---|
| 8,709,227 B2* | 4/2014 | Deguchi | ................. | C01B 31/18 205/340 |
| 8,709,228 B2* | 4/2014 | Deguchi | ................. | C01B 31/18 205/340 |
| 2005/0183962 A1* | 8/2005 | Oakes | ....................... | C25B 1/04 205/340 |
| 2010/0133110 A1* | 6/2010 | Nocera | ................... | C25B 1/003 205/340 |
| 2011/0005590 A1* | 1/2011 | Walukiewicz | .......... | C25B 1/003 136/256 |
| 2011/0143929 A1 | 6/2011 | Sato et al. | | |
| 2013/0062216 A1 | 3/2013 | Yotsuhashi et al. | | |
| 2013/0105306 A1* | 5/2013 | Sonoda | .................. | B01J 35/004 204/242 |
| 2014/0360883 A1* | 12/2014 | Deguchi | ................. | C25B 1/003 205/340 |
| 2016/0060773 A1* | 3/2016 | Sekimoto | .................. | C25B 3/04 205/340 |

FOREIGN PATENT DOCUMENTS

| | | |
|---|---|---|
| JP | 5-311476 | 11/1993 |
| JP | 6-126189 | 5/1994 |
| JP | 7-188961 | 7/1995 |
| JP | 2526396 | 6/1996 |
| JP | 2646834 | 5/1997 |
| JP | 2003-238104 | 8/2003 |
| JP | 2003-275599 | 9/2003 |
| JP | 2004-59507 | 2/2004 |
| JP | 3876305 | 11/2006 |
| JP | 4158850 | 7/2008 |
| JP | 2010-64066 | 3/2010 |
| JP | 2011-94194 | 5/2011 |
| JP | 2013-17929 | 1/2013 |
| WO | 2012/046374 | 4/2012 |

* cited by examiner

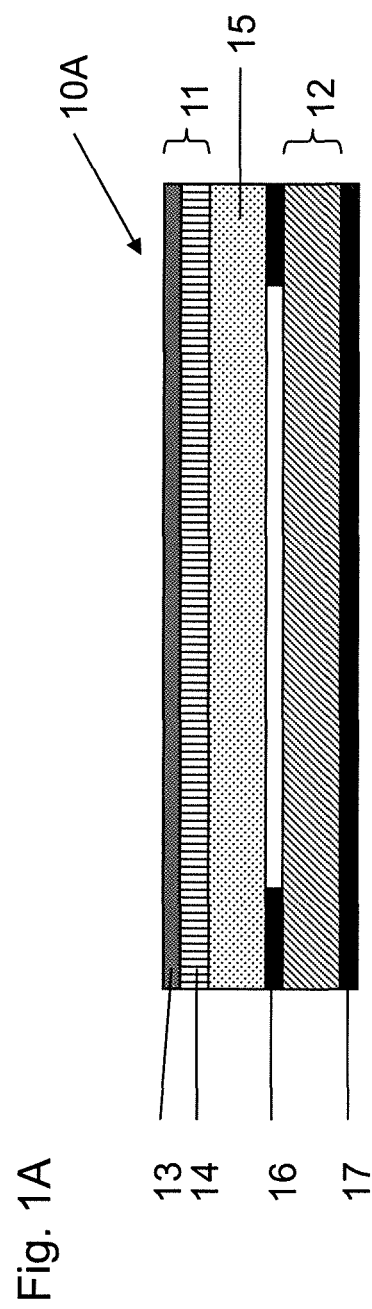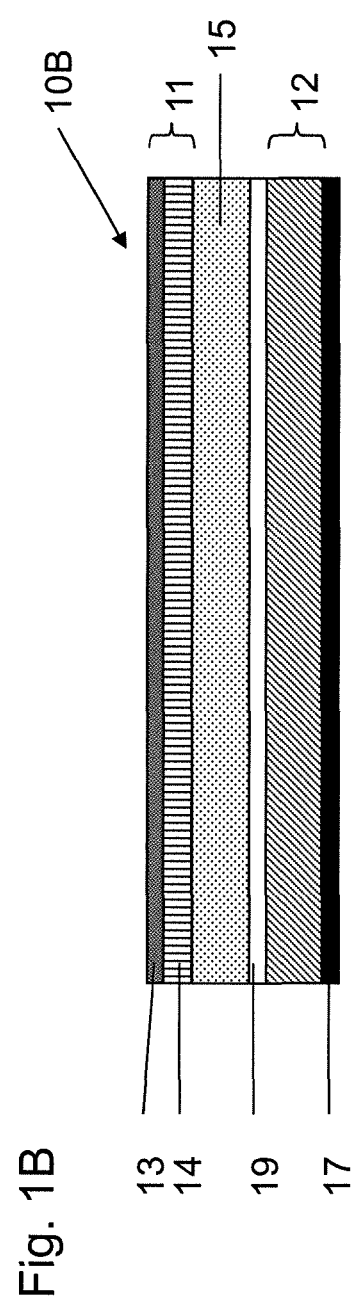
Fig. 1A
Fig. 1B

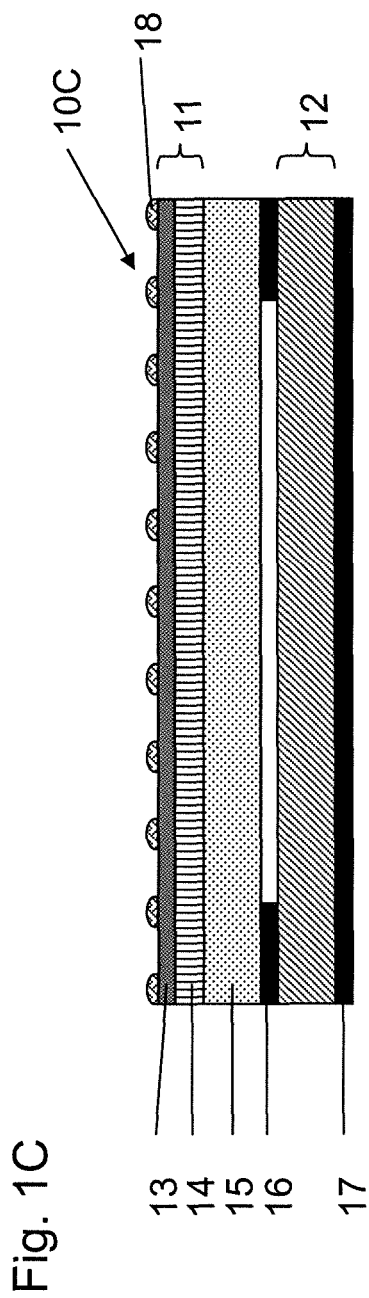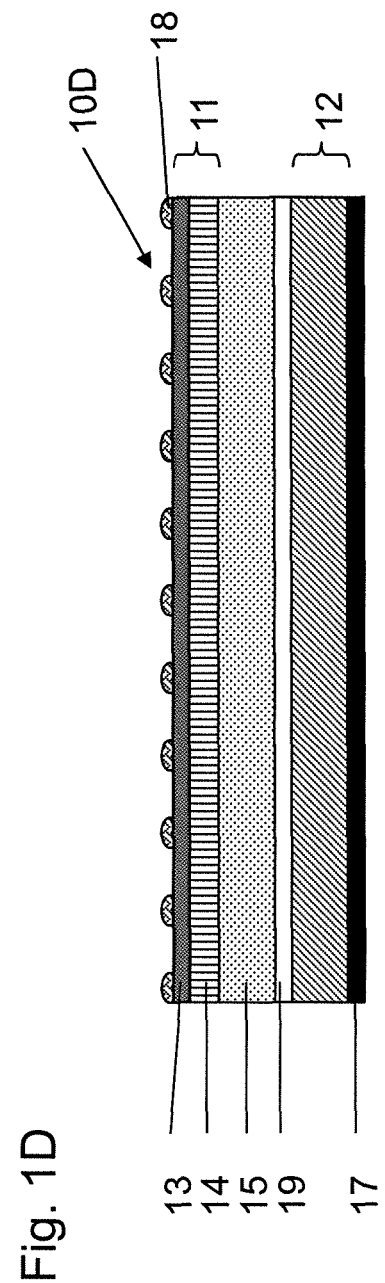

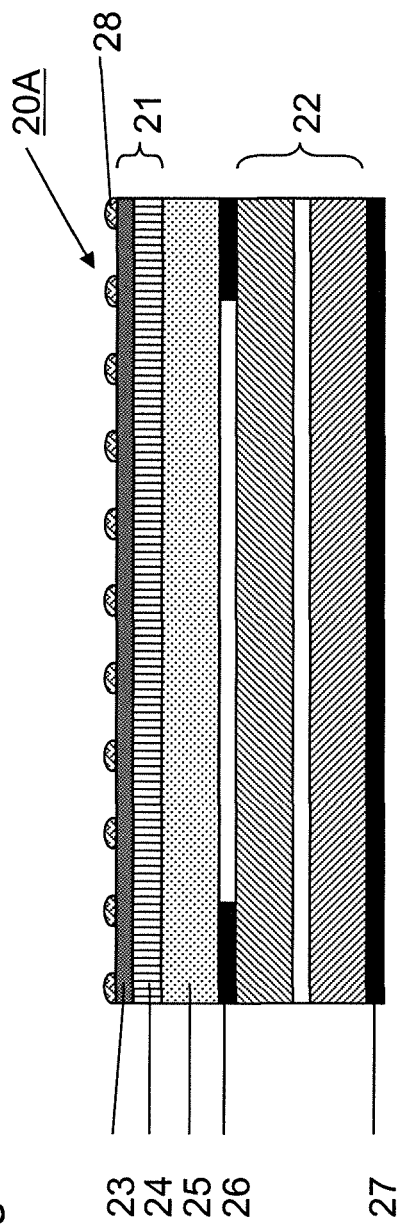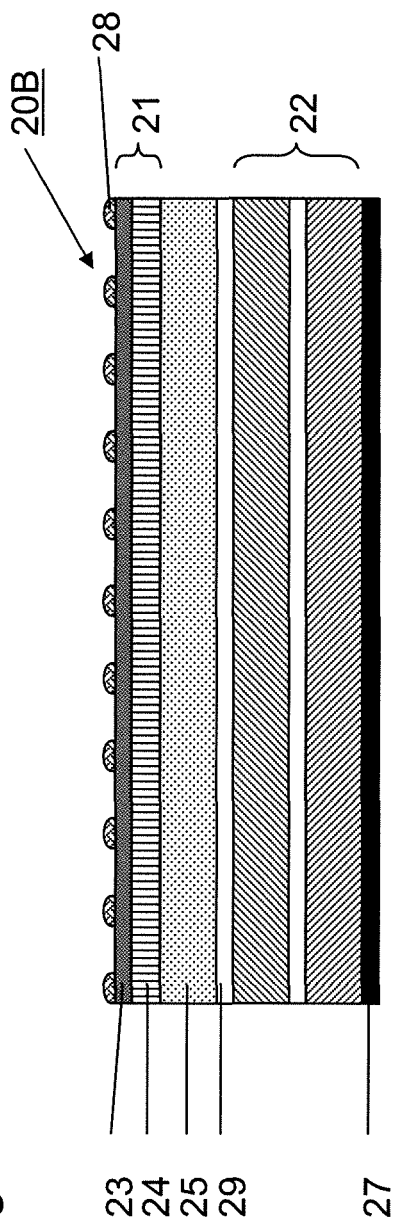

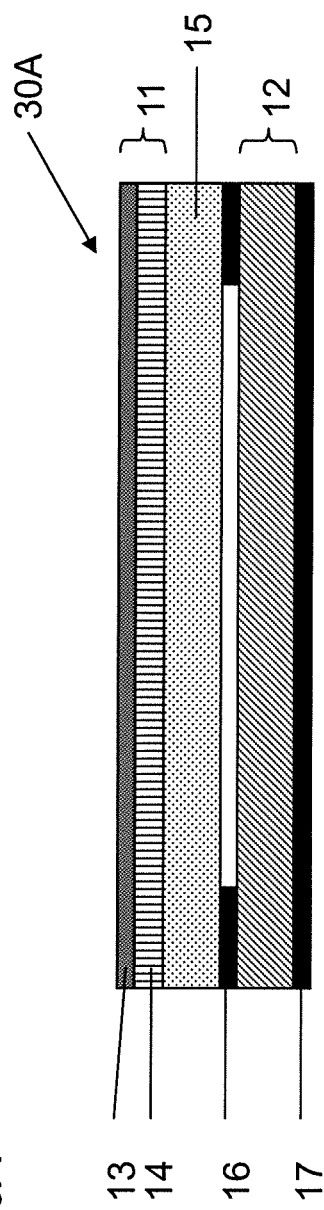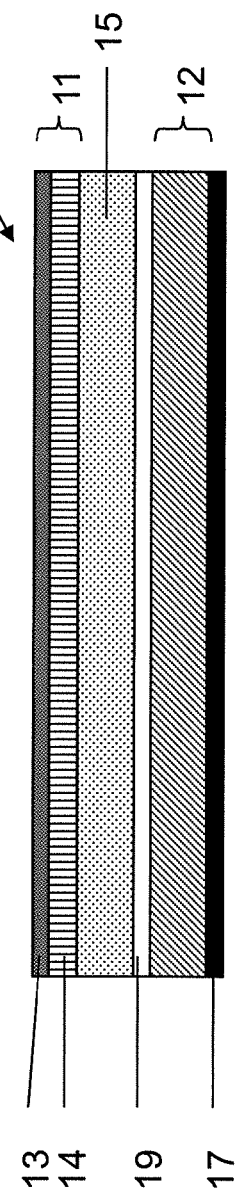
Fig. 6A
Fig. 6B

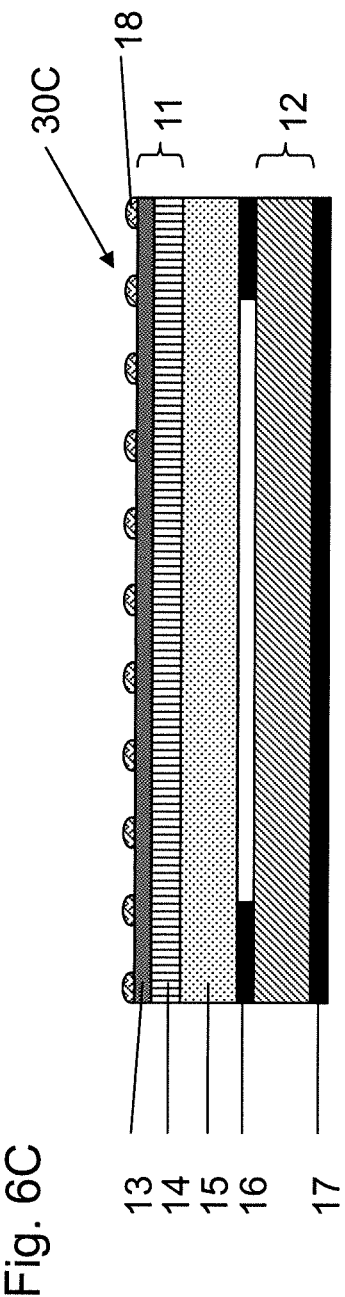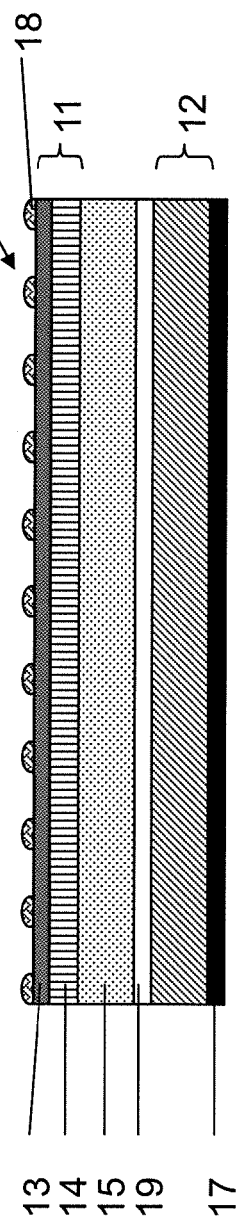

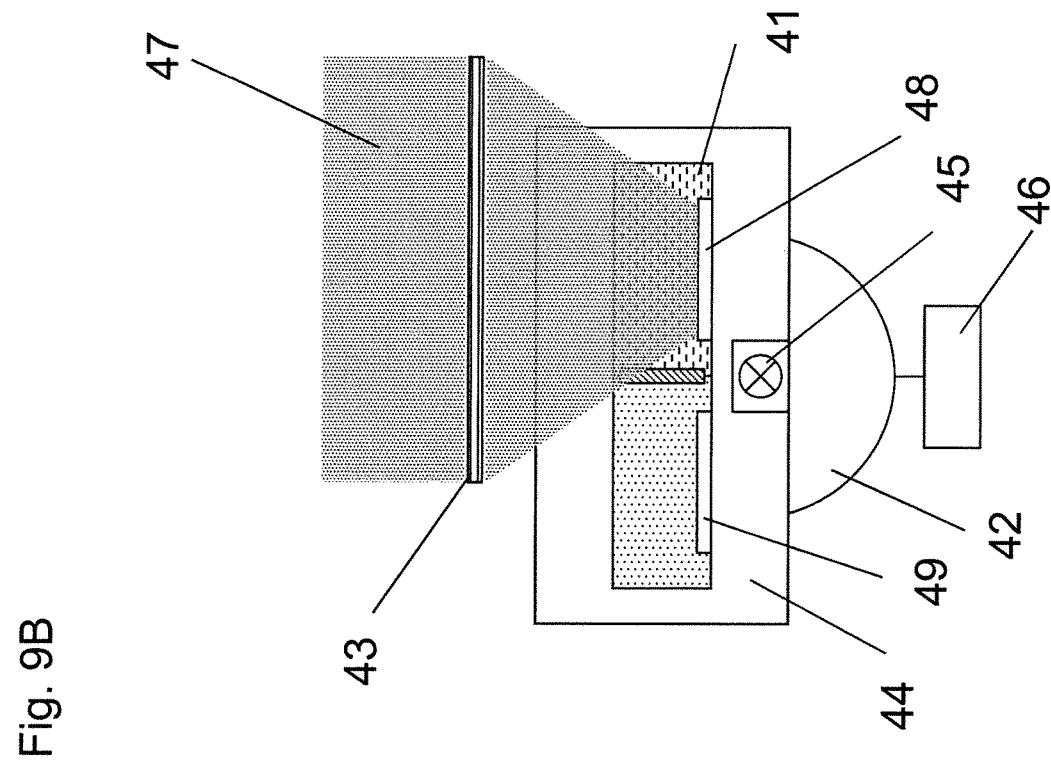
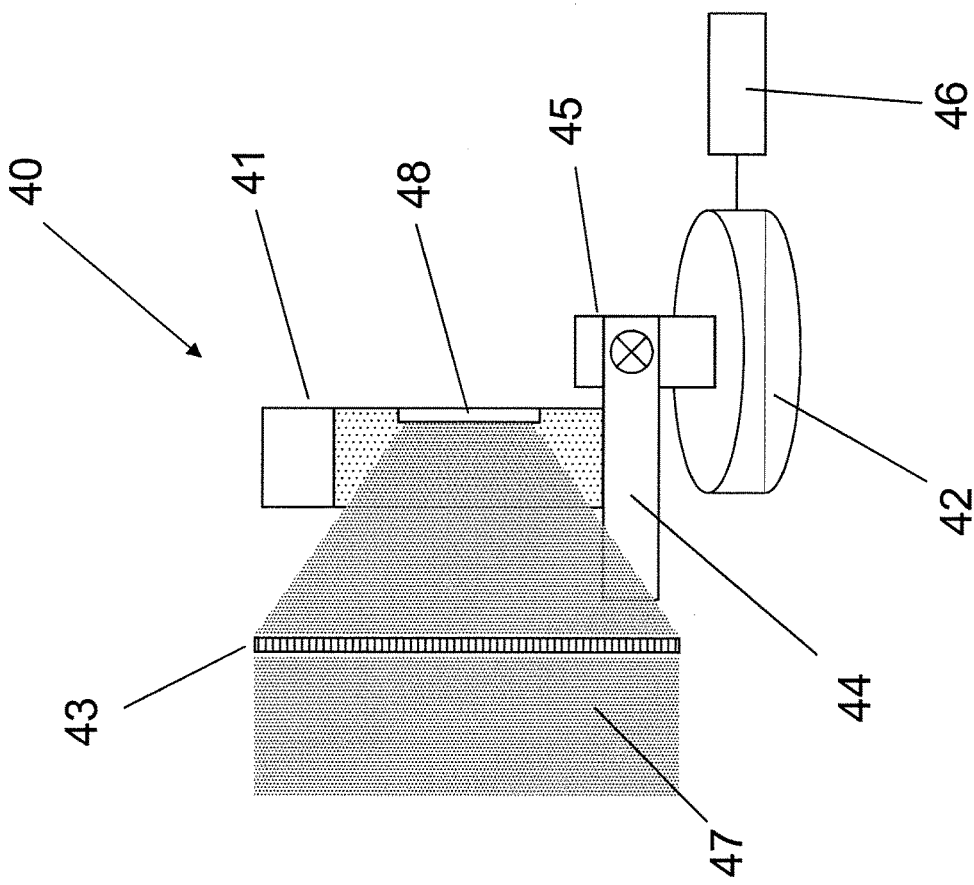
Fig. 9A
Fig. 9B

CARBON DIOXIDE REDUCING METHOD, CARBON DIOXIDE REDUCING CELL, AND CARBON DIOXIDE REDUCING APPARATUS

CROSS-REFERENCE TO RELATED APPLICATIONS

This application claims the priorities of Japanese Patent Application No. 2013-106871 filed in Japan on May 21, 2013 and Japanese Patent Application No. 2013-161586 filed in Japan on Aug. 2, 2013, the contents of which are hereby incorporated by references.

BACKGROUND

1. Technical Field

The present disclosure relates to a carbon dioxide reducing method, a carbon dioxide reducing cell, and a carbon dioxide reducing apparatus.

2. Related Art

Japanese Patent Laid-Open Publication No. S55-105625 (Patent Literature 1), Japanese Patent No. 2526396 (Patent Literature 2), Japanese Patent No. 4158850 (Patent Literature 3), Japanese Patent No. 3876305 (Japanese Patent Laid-Open Publication No. 2003-275599) (Patent Literature 4), Japanese Patent Laid-Open Publication No. 2013-017929 (Patent Literature 5), Japanese Patent No. 2646834 (Japanese Patent Laid-Open Publication No. H04-166076) (Patent Literature 6), Japanese Patent Laid-Open Publication No. 2010-064066 (Patent Literature 7), Japanese Patent Laid-Open Publication No. 2011-094194 (Patent Literature 8), Japanese Patent Laid-Open Publication No. H05-311476 (Patent Literature 9), Japanese Patent Laid-Open Publication No. H07-188961 (Patent Literature 10), WO 2012/046374 (Patent Literature 11) and Japanese Patent Laid-Open Publication No. 2003-238104 (Patent Literature 12) disclose methods for reducing carbon dioxide, using optical energy.

Japanese Patent Laid-Open Publication No. S55-105625 (Patent Literature 1) and Japanese Patent No. 2526396 (Patent Literature 2) disclose methods of using, as a photo-catalyst material, an oxide semiconductor such as titania to reduce carbon dioxide.

Japanese Patent No. 4158850 (Patent Literature 3) discloses a technique of using a photocatalyst material synthesized from a predetermined metal and semiconductor to reduce carbon dioxide.

Japanese Patent No. 3876305 (Japanese Patent Laid-Open Publication No. 2003-275599) (Patent Literature 4) and Japanese Patent Laid-Open Publication No. 2013-017929 (Patent Literature 5) disclose methods of irradiating a specific photocatalyst with sunlight or the like to reduce carbon dioxide.

Japanese Patent No. 2646834 (Japanese Patent Laid-Open Publication No. 04-166076) (Patent Literature 6) discloses a photosynthesis reactor system in which sunlight is concentrated to reduce carbon dioxide through photosynthesis organisms.

Japanese Patent Laid-Open Publication No. 2010-064066 (Patent Literature 7) and Japanese Patent Laid-Open Publication No. 2011-094194 (Patent Literature 8) disclose methods of irradiating a cathode formed of a photocatalyst composed of a semiconductor material and a metal complex material with light to reduce carbon dioxide.

Japanese Patent Laid-Open Publication No. 05-311476 (Patent Literature 9) and Japanese Patent Laid-Open Publication No. 07-188961 (Patent Literature 10) disclose methods of irradiating an anode composed of a semiconductor material such as titania with light to reduce carbon dioxide on a cathode. The methods disclosed in Japanese Patent Laid-Open Publication No. 05-311476 (Patent Literature 9) and Japanese Patent Laid-Open Publication No. 07-188961 (Patent Literature 10) require an external power source, such as a solar battery or potentiostat, separately.

WO 2012/046374 (Patent Literature 11) discloses a method of irradiating an anode made of gallium nitride with light to reduce carbon dioxide on a cathode. The method disclosed in WO 2012/046374 does not require an external power source such as a solar battery or potentiostat.

Japanese Patent Laid-Open Publication No. 2003-238104 (Patent Literature 12) discloses an optically-generating device for generating hydrogen from sunlight, the optically-generating device including an anode having] a photocatalyst layer formed on a surface of a p-type semiconductor layer of a solar cell having a pn junction.

However, conventional techniques do not make it possible to subject carbon dioxide to reducing treatment to produce a reduction product with a high efficiency.

SUMMARY

One non-limiting and exemplary embodiment provides a novel carbon dioxide reducing method for producing, from carbon dioxide, a reduction product, and a carbon dioxide reducing apparatus.

The carbon dioxide reducing method according to the present disclosure is a carbon dioxide reducing method, including:

(a) preparing a carbon dioxide reducing cell including:
  a cathode chamber that holds a first electrolytic solution containing carbon dioxide;
  an anode chamber that holds a second electrolytic solution;
  a proton exchange membrane inserted between the cathode chamber and the anode chamber;
  a cathode set inside the cathode chamber to contact the first electrolytic solution, and the cathode having at least one selected from a group including copper, gold, silver and indium, respective alloys of these elements, and respective metal compounds of these elements on a surface of the cathode; and
  an anode set inside the anode chamber to contact the second electrolytic solution, the anode having a first semiconductor layer constituted by a nitride semiconductor including an $Al_xGa_{1-x}N$ layer wherein $0 \leq x \leq 0.25$, and an n-type GaN layer, and a second semiconductor layer constituted by a semiconductor having a pn junction structure and electrically connected to the first semiconductor layer through its p-type semiconductor layer, and further the anode being electrically connected to the cathode through no external power source; and (b) irradiating the anode with light to reduce carbon dioxide contained in the first electrolytic solution on the cathode.

The carbon dioxide reducing method according to the present disclosure makes it possible to give a predetermined reduction product from carbon dioxide with a high efficiency.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

BRIEF DESCRIPTION OF DRAWINGS

The present disclosure will become readily understood from the following description of non-limiting and exemplary embodiments thereof made with reference to the accompanying drawings, in which like parts are designated by like reference numeral and in which:

FIG. 1A is a sectional view illustrating an anode according to embodiment 1;

FIG. 1B is a sectional view illustrating an anode according to embodiment 1;

FIG. 1C is a sectional view illustrating an anode according to embodiment 1;

FIG. 1D is a sectional view illustrating an anode according to embodiment 1;

FIG. 2A is a sectional view illustrating a different anode according to embodiment 1;

FIG. 2B is a sectional view illustrating a different anode according to embodiment 1;

FIG. 6A is a sectional view illustrating an anode according to embodiment 2;

FIG. 6B is a sectional view illustrating an anode according to embodiment 2;

FIG. 6C is a sectional view illustrating an anode according to embodiment 2;

FIG. 6D is a sectional view illustrating an anode according to embodiment 2;

FIG. 9A is a schematic side view of an example of a carbon dioxide reducing apparatus according to embodiment 2, which has a carbon dioxide reducing cell, a sun tracking device, and a light-concentrating device;

FIG. 9B is a schematic plan view of the example of the carbon dioxide reducing apparatus according to embodiment 2, which has the carbon dioxide reducing cell, the sun tracking device, and the light-concentrating device;

DETAILED DESCRIPTION

Figure 3:
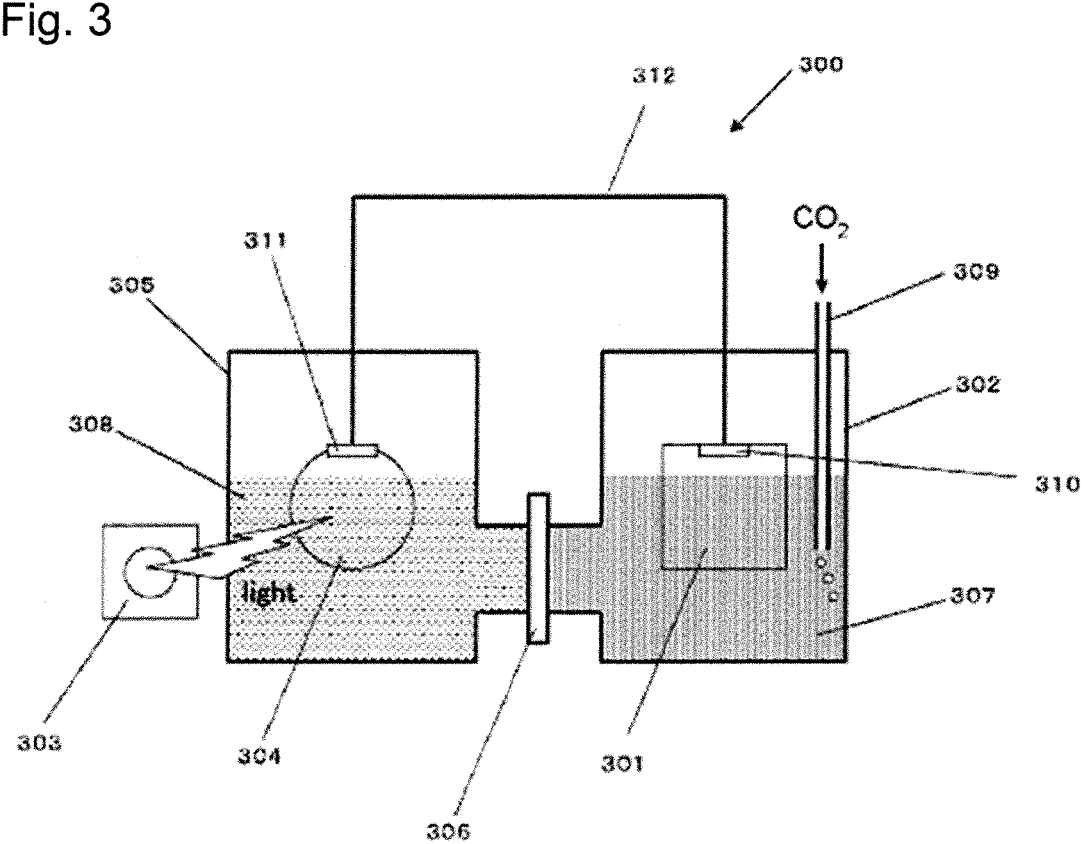
FIG. 3 is a schematic view illustrating a carbon dioxide reducing apparatus according to embodiment 1.

Findings on which the Present Disclosure is Based

Patent Literatures 1 to 12 report that carbon dioxide is reduced by irradiating a photocatalyst material or photochemical electrode with light. In other words, Patent Literatures 1 to 12 disclose that an organic substance such as formic acid or a hydrocarbon can be produced from carbon dioxide, using carriers (electrons or holes) generated in an anode and a cathode by irradiation with light.

According to Patent Literatures 4 to 6, a reduction product from carbon dioxide is obtained by irradiating a specific photocatalyst material or photoreactive microorganism with sunlight or the like. However, in the methods disclosed in Patent Literatures 4 to 6, a relatively high reaction temperature is necessary, and it is difficult to select the kind of the product obtained by carbon dioxide reduction.

Patent Literatures 7 to 11 disclose that carriers (electrons or holes) are generated by irradiating an anode or cathode with light, and the use of the carriers makes it possible to produce an organic component such as formic acid or a hydrocarbon from carbon dioxide. In such a reduction reaction of carbon dioxide by irradiating a photochemical electrode with light, the amount or kind of a reaction product obtained from carbon dioxide depends on the generation amount of carriers generated by photoexcitation, and the photo voltaic power generated in the photochemical electrode. In other words, in order to heighten the reduction reaction efficiency of carbon dioxide or the selectivity of the reaction product, it is necessary to restrain the excited carries from being recombined or increase the photo voltaic power induced in the photochemical electrode. However, in the reports so far, a structure for decreasing the loss of the excited carriers or a structure for improving the photo voltaic power is not integrated into the photochemical electrode (for example, the anode). Thus, there remains the problem that the reaction current amount is reduced or a desired reaction product cannot be obtained.

Japanese Patent Laid-Open Publication No. 2003-238104 discloses an anode having a structure in which a photocatalyst layer for exciting electrons and holes by irradiation with light is formed onto a surface of a p-type semiconductor layer of a solar cell having a pn junction composed of a p-type semiconductor and an n-type semiconductor. However, a hydrogen generating device having this anode disclosed in Japanese Patent Laid-Open Publication No. 2003-238104 does not have a structure for restraining recombination of photoexcited carriers. Thus, an object of this technique is to produce only hydrogen gas effectively by reduction reaction of water.

As described above, according to the methods reported in Patent Literatures 1 to 12, it is difficult to use only optical energy to reduce carbon dioxide, so that carbon monoxide or an organic substance is produced, as a reduction product from carbon dioxide, with a high efficiency, examples of the substance including formic acid, methane, ethylene, methanol, ethanol, isopropanol, allyl alcohol, acetaldehyde, and propionaldehyde. In particular, methane, ethylene, methanol, ethanol, isopropanol, allyl alcohol, acetaldehyde, or propionaldehyde has a more complicated structure than formic acid, which is likewise an organic substance, and is an organic substance difficult to be obtained as a reduction product from carbon dioxide by only optical energy. Hereinafter, in the present specification, the wording "organic substance having a more complicated structure" denotes methane, ethylene, methanol, ethanol, isopropanol, allyl alcohol, acetaldehyde, or propionaldehyde, which has a more complicated structure than formic acid, which is likewise an organic substance.

By contrast, the inventors have found out that by using, as a photochemical electrode (anode), constitution in which a first semiconductor layer made of a nitride semiconductor material and a second semiconductor layer having a pn junction structure are stacked from the light-irradiated surface side of the electrode, recombination of photoexcited carriers is restrained, and further the photo voltaic power generated in the anode (photochemical electrode) is heightened, so as to improve the reduction efficiency of carbon dioxide on the cathode. Furthermore, the inventors have found out that at least one from the following is produced on the cathode as a reduction product of carbon dioxide: carbon monoxide, formic acid, methane, ethylene, methanol, ethanol, isopropanol, allyl alcohol, acetaldehyde, and propionaldehyde.

The carbon dioxide reducing method according to the present disclosure has been made on the basis of these findings.

A carbon dioxide reducing method according to a first aspect includes:

(a) preparing a carbon dioxide reducing cell including:
- a cathode chamber that holds a first electrolytic solution containing carbon dioxide;
- an anode chamber that holds a second electrolytic solution;
- a proton exchange membrane inserted between the cathode chamber and the anode chamber;
- a cathode set inside the cathode chamber to contact the first electrolytic solution and, the cathode having at least one selected from a group including copper, gold, silver and indium, respective alloys of these elements, and respective metal compounds of these elements on a surface of the cathode; and
- an anode set inside the anode chamber to contact the second electrolytic solution, the anode having a first semiconductor layer constituted by a nitride semiconductor comprising an $Al_xGa_{1-x}N$ layer wherein $0 \leq x \leq 0.25$, and an n-type GaN layer, and a second semiconductor layer constituted by a semiconductor having a pn junction structure and electrically connected to the first semiconductor layer through its p-type semiconductor layer, and further the anode being electrically connected to the cathode through no external power source; and (b) irradiating the anode with light to reduce carbon dioxide contained in the first electrolytic solution on the cathode.

Further, as a carbon dioxide reducing method of a second aspect, in the first aspect, in the course of irradiating step (b), the anode may be irradiated with light having a wavelength of 365 nm or less, and light having a wavelength of 365 nm or more.

Further, as a carbon dioxide reducing method of a third aspect, in the first aspect, in the course of preparing step (a), the value x in the $Al_xGa_{1-x}N$ layer, which constitutes the first semiconductor layer, may be set from 0.05 or more to 0.15 or less.

Further, as a carbon dioxide reducing method of a fourth aspect, in the first aspect, in the course of preparing step (a), the n-type GaN, which constitutes the first semiconductor layer, may be of an $n^+$-type.

Further, as a carbon dioxide reducing method of a fifth aspect, in the first aspect, in the course of preparing step (a), the semiconductor having the pn junction, which constitutes the second semiconductor layer, may be silicon or gallium arsenic.

Further, as a carbon dioxide reducing method of a sixth aspect, in the first aspect, in the course of preparing step (a), the $Al_xGa_{1-x}N$ layer may be at least partially coated with fine particles of nickel oxide.

Further, as a carbon dioxide reducing method of a seventh aspect, in the first aspect, in the course of preparing step (a), the first electrolytic solution may be any one selected from a group including an aqueous potassium bicarbonate solution, an aqueous sodium bicarbonate solution, an aqueous potassium chloride solution, and an aqueous sodium chloride solution.

Further, as a carbon dioxide reducing method of an eighth aspect, in the first aspect, in the course of preparing step (a), the second electrolytic solution may be an aqueous sodium hydroxide solution.

Further, as a carbon dioxide reducing method of a ninth aspect, in the first aspect, in the course of irradiating step (b), the carbon dioxide reducing cell may be positioned at normal temperature under the atmospheric pressure.

Further, as a carbon dioxide reducing method of a tenth aspect, in the first aspect, in the course of irradiating step (b), the anode may be irradiated with sunlight.

Further, as a carbon dioxide reducing method of a eleventh aspect, in the tenth aspect, further may include, before the irradiating step (b), (c) preparing a sun tracking device including:
- a stand section that fixes the carbon dioxide reducing cell;
- a driving section that changes the facing direction of the carbon dioxide reducing cell; and
- a control section that controls the facing direction of the carbon dioxide reducing cell in accordance with the movement of the sun, wherein the sun tracking device is a device in which through the control section, the driving section moves the stand section to allow a front surface region of the anode of the carbon dioxide reducing cell to face to sun.

Further, as a carbon dioxide reducing method of a twelfth aspect, in the tenth aspect, in the irradiating step (b), a light-concentrating device for concentrating sunlight is used to concentrate sunlight, and then the anode may be irradiated with the concentrated sunlight.

Further, as a carbon dioxide reducing method of a thirteenth aspect, in the twelfth aspect, in the course of irradiating step (b), the light may be concentrated by the light-concentrating device as having an intensity of from 200 $mW/cm^2$ or more to 10 $W/cm^2$ or less.

Further, as a carbon dioxide reducing method of a fourteenth aspect, in the first aspect, in the irradiating step (b), the anode may be irradiated with light to reduce carbon dioxide contained in the first electrolytic solution on the cathode, thereby converting the carbon dioxide to an organic substance.

Further, as a carbon dioxide reducing method of a fifteenth aspect, in the fourteenth aspect, in the irradiating step (b), the carbon dioxide may be reduced to yield at least one of carbon monoxide, formic acid, methane, ethylene, methanol, ethanol, isopropanol, and allyl alcohol.

A carbon dioxide reducing cell for reducing carbon dioxide using light according to a sixteenth aspect, includes:
- a cathode chamber that holds a first electrolytic solution containing carbon dioxide;
- an anode chamber that holds a second electrolytic solution;
- a proton exchange membrane inserted between the cathode chamber and the anode chamber;
- a cathode set inside the cathode chamber to contact the first electrolytic solution, and the cathode having any one selected from a group including copper, gold, silver and indium, respective alloys of these elements, and respective metal compounds of these elements on a surface of the cathode; and
- an anode set inside the anode chamber to contact the second electrolytic solution, the anode having a first semiconductor layer constituted by a nitride semiconductor comprising an $Al_xGa_{1-x}N$ layer wherein $0 \le x \le 0.25$, and an n-type GaN layer, and a second semiconductor layer constituted by a semiconductor having a pn junction structure and electrically connected to the first semiconductor layer through its p-type semiconductor layer, and further the anode being electrically connected to the cathode through no external power source.

A carbon dioxide reducing apparatus according to a seventeenth aspect includes:
the carbon dioxide reducing cell according to the sixteenth aspect; and
a sun tracking device that synchronizes a change in the facing direction of the carbon dioxide reducing cell with the movement of the sun to allow a front surface region of the anode to face to the sun, wherein the sun tracking device includes:
a stand section that fixes the carbon dioxide reducing cell;
a driving section that changes the facing direction of the carbon dioxide reducing cell; and
a control section that controls the facing direction of the carbon dioxide reducing cell in accordance with the movement of the sun,
wherein the sun tracking device is a device in which through the control section, the driving section moves the stand section to allow the front surface region of the anode of the carbon dioxide reducing cell to face to sun.

Further, as a carbon dioxide reducing apparatus of an eighteenth aspect, in the seventeenth aspect, further may include a light-concentrating device for concentrating sunlight to irradiate a predetermined surface region of the anode with the concentrated sunlight.

Further, as a carbon dioxide reducing apparatus of a nineteenth aspect, in the eighteenth aspect, the light-concentrating device may be any of a biconcave mirror, a planoconvex lens, and a Fresnel lens.

Further, as a carbon dioxide reducing apparatus of a twentieth aspect, in the eighteenth aspect, the light-concentrating device may be a concave mirror.

Referring to the attached drawings, the following will describe a carbon dioxide reducing cell, a carbon dioxide reducing apparatus and a carbon dioxide reducing method according to each embodiment of the present disclosure.

Embodiment 1

A description will be made regarding a carbon dioxide reducing cell, a carbon dioxide reducing apparatus and a carbon dioxide reducing method according to embodiment 1.
<Photochemical Electrode (Anode)>
FIGS. 1A to 1D are sectional views illustrating photochemical electrodes (also referred to as "anodes" hereinafter), respectively, that each constitute the carbon dioxide reducing cell according to embodiment 1.

FIG. 1A illustrates a basic structure of an anode 10A. The anode 10A has a stacked structure having, from a light-irradiated surface side thereof, a first semiconductor layer 11 made of a nitride semiconductor material, a conductive substrate 15, and a second semiconductor layer 12 having a pn junction structure. The anode 10A has, besides this structure, an electrode part 16 through which the conductive substrate 15 and the second semiconductor layer 12 are electrically connected to each other, and a terminal electrode part 17.

The first semiconductor layer 11 is composed of $Al_xGa_{1-x}N$ layer 13 wherein $0 \le x \le 0.25$ (referred to also as an "AlGaN layer" hereinafter), and an n-type GaN layer 14 (referred to also as an "n-GaN layer" hereinafter).

The second semiconductor layer 12 has a pn junction structure, and is electrically connected, through its p-type semiconductor layer, to the n-GaN layer 14 side of the first semiconductor layer 11.

The method for producing the anode 10A is not limited, and may be generally a first method or a second method described below.

The first method will be described. The n-GaN layer 14 and the AlGaN layer 13 are formed in this order as the first semiconductor layer 11 onto one of the two surfaces of the conductive substrate 15 as a base. Next, the second semiconductor layer 12, which has a pn junction structure, is formed onto the other surface of the conductive substrate 15 with the electrode part 16 interposed therebetween. The formation of the p-type semiconductor layer of the second semiconductor layer 12 is attained onto the electrode part 16 side of the workpiece. Thereafter, the terminal electrode part 17 is added onto the n-type semiconductor layer of the second semiconductor layer 12. In this way, the anode 10A can be produced.

The second method will be described. The n-GaN layer 14 and the AlGaN layer 13 are formed in this order as the first semiconductor layer 11 onto one of the two surfaces of the conductive substrate 15 as a base. Next, a separately produced structural body composed of the second semiconductor layer 12, which has a pn junction structure, is electrically connected through the electrode part 16 onto the other surface of the conductive substrate 15. Thereafter, the terminal electrode part 17 is added onto the n-type semiconductor layer of the second semiconductor layer 12. In this way, the anode 10A can be produced.

In the anode 10A produced by the second method, the electrode part 16 is arranged onto portions of the other surface of the conductive substrate 15 and portions of one of the surfaces of the p-type semiconductor layer of the second semiconductor layer 12.

The terminal electrode part 17 is a connecting terminal of the anode 10A, and connected through a conductive wire to a cathode. The anode 10A and the cathode are electrically connected to each other through no external power source such as potentiostat.

The first semiconductor layer 11, which constitutes the anode 10A and is made of the nitride semiconductor, is generally formed as a thin film. The method for forming this layer is not particularly limited as far as the method makes it possible to form a thin film of the nitride semiconductor onto the conductive substrate 15. The method is, for example, an metal organic vapor phase epitaxy.

Considering that the second semiconductor layer 12 is also needed to be irradiated with light, the conductive substrate 15 may be a substrate having translucency. The material of the conductive substrate 15 is, for example, a low resistive single-crystal gallium nitride (GaN) substrate, gallium oxide ($Ga_2O_3$) substrate, silicon carbide (SiC) substrate or zinc oxide (ZnO) substrate.

The electrode part 16 is a metallic layer in a thin film form, and is produced by, for example, a vacuum deposition method.

The following will describe a basic function of the anode 10A, which is a photochemical electrode.

When the front surface of the anode 10A is irradiated with light having a wavelength absorbable into the first semiconductor layer 11 and a wavelength absorbable into the second semiconductor layer 12, the light having the wavelength absorbable into the first semiconductor layer 11 is absorbed into a region made of the AlGaN layer 13, so that photoexcitation is caused. The light having the wavelength absorbable into the region made of the AlGaN layer 13 is light having a wavelength of 365 nm or less.

Carriers generated by the photoexcitation contribute to redox reaction. The carriers are electrons or holes. Specifically, holes generated inside the AlGaN layer 13 by the photoexcitation are shifted onto the front surface of the anode 10A to oxidize water contacting the anode 10A, so that oxygen is produced. In short, the anode 10A functions as an oxygen producing electrode.

The band gap value of the AlGaN layer 13, that is, the forbidden band width thereof is 3.4 eV or more. It is therefore necessary to irradiate the AlGaN layer 13 with light having a wavelength of 365 nm or less in order to use the AlGaN layer 13 as a photochemical electrode using light. For this necessity, from the viewpoint of efficient use of light, the value of x representing the component ratio of Al contained in the $Al_xGa_{1-x}N$ layer 13 preferably satisfies the range of $0 \leq x \leq 0.25$, and more preferably satisfies the range of $0.05 \leq x \leq 0.15$.

The thickness of the region of the AlGaN layer 13 where the light having a wavelength within the above-mentioned wavelength range is absorbed inside the AlGaN layer 13, that is, the depth of this absorbing region from the front surface of the AlGaN layer 13 is about 100 nm. The thickness of this absorbing region may be selected dependently also on the band gap value of the AlGaN layer 13. The direction of this depth is parallel to the thickness direction of the AlGaN layer 13. Thus, the AlGaN layer 13 has a thickness, for example, ranging from 70 nm or more to 1000 nm or less. The AlGaN layer 13 may have a thickness ranging from 80 nm or more to 200 nm or less.

On the other hand, electrons generated inside the AlGaN layer 13 by the photoexcitation are supplied via the n-GaN layer 14 of the first semiconductor layer 11, the conductive substrate 15, and the electrode part 16 to the p-type semiconductor layer of the second semiconductor layer 12. The n-GaN layer 14 may be of an $n^+$-type. When the n-GaN layer 14 is of an $n^+$-type, the electrical resistance component of the n-GaN layer 14 becomes small. Accordingly, a loss which follows the transport of the carriers can be decreased.

In order to reduce the n-GaN layer 14 further in electrical resistance, an impurity may be doped into the n-GaN layer 14. The impurity is, for example, silicon. The carrier concentration in the $n^+$-type GaN layer 14 to which silicon is added is, for example, $1 \times 10^{18}/cm^3$ or more, and may be from about 2 to $8 \times 10^{18}/cm^3$.

The second semiconductor layer 12 having the pn junction structure is formed of a junction structure composed of a semiconductor layer showing p-type property and a semiconductor layer showing n-type property. The second semiconductor layer 12 may contain a semiconductor layer having i-property between the p-type semiconductor layer and the n-type semiconductor layer. In conclusion, in the present specification, the "pn junction structure" also includes a pin junction structure.

The pn junction structure is generally made of the same material. However, the structure may be made of materials different from each other.

The second semiconductor layer 12 absorbs light having a wavelength absorbable into the second semiconductor layer 12 to generate excited carriers, and further generate photoelectromotive force. The light having the wavelength absorbable into the second semiconductor layer 12 is main component of light having a wavelength of 360 nm or more, and is, for example, light having a wavelength of from 360 nm or more to 2000 nm or less. The wavelength absorbable into the second semiconductor layer 12 is, for example, a visible ray. When the second semiconductor layer 12 is made of silicon, the second semiconductor layer 12 can absorb light as far as the light has a wavelength of about 1100 nm or less. When the second semiconductor layer 12 is made of germanium, the second semiconductor layer 12 can absorb light as far as the light has a wavelength of about 1800 nm or less. The light having the wavelength absorbable into the second semiconductor layer 12 is light transmitted through the first semiconductor layer 11.

The holes excited by the light irradiation onto the second semiconductor layer 12 are recombined with the electrons supplied from the first semiconductor layer 11 side. The electrons excited in the second semiconductor layer 12 are collected into the terminal electrode part 17 arranged in the anode 10A. The electrons collected in the terminal electrode part 17 are supplied, through a conducting wire electrically connected to the part, to the cathode side for reducing carbon dioxide.

The potential supplied to the cathode is the sum of the photoelectromotive force generated in the first semiconductor layer 11 and that generated in the second semiconductor layer 12. In other words, by using the anode 10A in which the first semiconductor layer 11 and the second semiconductor layer 12 are stacked onto each other, the photo voltaic power generated by light irradiation can be improved. As a result, at least one of the following products can be obtained on the cathode as a reduction product of carbon dioxide: carbon monoxide, formic acid, methane, ethylene, methanol, ethanol, isopropanol, allyl alcohol, acetaldehyde, and propionaldehyde.

FIG. 1B is a sectional view illustrating an anode 10B in which a first semiconductor layer 11 and a second semiconductor layer 12 are joined with each other through a transparent conductive layer 19. The transparent conductive layer 19 is a layer in place of the electrode part 16. The constitution of the anode is not limited as far as the first semiconductor layer 11 and the second semiconductor layer 12 are electrically connected to each other and the second semiconductor layer 12 is irradiated with light transmitted through the first semiconductor layer 11.

As illustrated in FIG. 1C and FIG. 1D, in order to heighten the anodes 10A and 10B in oxygen generating efficiency and endurance, many nickel oxide fine particles 18 may be dispersed on the front surface of their AlGaN layer 13.

The specification of U.S. patent application Ser. No. 13/453,669 filed by the present inventors is incorporated by reference into the present specification.

FIG. 2A and FIG. 2B are each a sectional view of an anode, which is composed of a second semiconductor layer 22 having a plurality of pn junction structures. Examples of a combination of materials for each of the pn junction structures, which constitute the second semiconductor layer 22, include gallium arsenic (GaAs) and silicon (Si), amorphous silicon (a-Si) and crystalline silicon (c-Si), and the like. The combination of the materials of each of the pn junction structures, which constitute the second semiconductor layer 22, is not limited as far as a combination of materials has a band gap making it possible to absorb effectively light transmitted through the first semiconductor layer 21.

(Carbon Dioxide Reducing Cell)

FIG. 3 is a schematic view illustrating a carbon dioxide reducing cell 300. The carbon dioxide reducing cell 300 has a cathode chamber 302, an anode chamber 305, and a proton exchange membrane 306.

Inside the cathode chamber 302, a first electrolytic solution 307 is held, and further the cathode chamber 302 has a cathode 301. The cathode 301 contacts the first electrolyte 307. Specifically, the cathode 301 is immersed in the first electrolytic solution 307.

The first electrolytic solution 307 is, for example, an aqueous potassium bicarbonate solution, aqueous sodium bicarbonate solution, aqueous potassium chloride solution or aqueous sodium chloride solution.

In the case of each of these aqueous solutions, the salt concentration in the first electrolytic solution is, for example, 1 mol/L or more, and may be 3 mol/L or more.

The first electrolytic solution 307 contains carbon dioxide. The concentration of carbon dioxide is not limited. The first electrolytic solution 307 may be acidic in the state that carbon dioxide is dissolved in the first electrolytic solution 307.

A constituent material of the cathode 301 on which carbon dioxide is reduced is a metal or metallic compound. The metal which constitutes the cathode 301 is, for example, copper, gold, silver or indium, or an alloy of one or more of these metals. The metallic compound which constitutes the cathode 301 is, for example, an oxide or chloride of one or more of these metals.

The cathode 301 may be composed of one or more of the above-mentioned metals, alloys and metallic compounds, or may be composed of a substrate on which one or more of the above-mentioned metals, alloys and metallic compounds are held. For example, the cathode 301 may be an electrode in which a predetermined metal or metallic compound is formed in a thin film on a substrate made of glass, glassy carbon (registered trademark) (a gas-impermeable carbon product in a black glass form) or the like. The cathode 301 may be formed by dispersing a plurality of fine particles made of a metal or metallic compound onto a conductive substrate. As illustrated in FIG. 3, at least one portion of the cathode 301 may be immersed in the first electrolytic solution 307.

Inside the anode chamber 305, a second electrolytic solution 308 is held, and further the anode chamber 305 has an anode 304. In the present specification, the anode 304 denotes a photochemical electrode since the anode 304 is irradiated with light.

The anode 304 has a first semiconductor layer made of a nitride semiconductor in which an AlGaN layer and an n-GaN layer are stacked onto each other, and a second semiconductor layer composed of a semiconductor having a pn junction structure. The constitution of the anode 304 is, for example, the anode 10A. The anode 304 contacts the second electrolytic solution 308. Specifically, the anode 304 is immersed in the second electrolytic solution 308.

The second electrolytic solution 308 is, for example, an aqueous sodium hydroxide solution.

Even when the second electrolytic solution is any aqueous solution, the salt concentration in the solution is, for example, 1 mol/L or more, and may be about 5 mol/L. The second electrolytic solution 308 is preferably basic.

As will also described later, a surface area of the anode 304 immersed in the second electrolytic solution 308 is irradiated with light having a wavelength absorbable into the first semiconductor layer and a wavelength absorbable into the second semiconductor layer. The wavelength absorbable into the first semiconductor layer is, for example, a wavelength of 365 nm or less. The wavelength absorbable into the second semiconductor layer is, for example, 365 nm or more. The light is emitted from a light source 303. The light source 303 is, for example, a xenon lamp, a mercury lamp, a halogen lamp, a pseudo sunlight source or sunlight, or a combination of two or more of these light sources.

In order to separate the first electrolytic solution 307 from the second electrolytic solution 308, the proton exchange membrane 306 is inserted between the cathode chamber 302 and the anode chamber 305. In other words, in the carbon dioxide reducing cell according to embodiment 1 of the present disclosure, the first electrolytic solution 307 and the second electrolytic solution 308 are not miscible with each other.

The proton exchange membrane 306 is not particularly limited as far as substantially only proton permeates through the membrane 306 and none of other substances can permeate through the membrane 306. The proton exchange membrane 306 is made of, for example, Nafion (registered trademark) (a perfluorocarbon material composed of a hydrophobic TEFLON (registered trademark) skeleton composed of carbon and fluorine atoms, and perfluoro side chains each having a sulfonate group; specifically, a copolymer of tetrafluoroethylene and perfluoro[2-(fluorosulfonylethoxy)propylvinyl ether]).

The cathode 301 and the anode 304 have an electrode terminal 310 and an electrode terminal 311, respectively. These electrode terminals 310 and 311 are electrically and directly connected to each other through a conductive wire 312. Between these electrode terminals 310 and 311, an external power source such as a battery or potentiostat is not electrically sandwiched.

<Carbon Dioxide Reducing Method>

The following describes a carbon dioxide reducing method using a carbon dioxide reducing cell.

The carbon dioxide reducing cell 300 may be put at room temperature under the atmospheric pressure.

As illustrated in FIG. 3, the anode 304 is irradiated with light from the light source 303. The light source 303 is, for example, a xenon lamp. Ordinary xenon lamps emit light having wavelengths of from 250 nm or more to 1400 nm or less. Thus, light emitted from the light source 303 composed of the xenon lamp has the light having a wavelength absorbable into the first semiconductor layer and the light having a wavelength absorbable into the second semiconductor layer.

As illustrated in FIG. 3, the carbon dioxide reducing cell may have a gas introducing pipe 309. Carbon dioxide contained in the first electrolytic solution 307 may be reduced while carbon dioxide is supplied through the gas introducing pipe 309 into the first electrolytic solution 307. An end of the gas introducing pipe 309 is immersed in the first electrolytic solution 307. Alternatively, before the start of the reduction of carbon dioxide, carbon dioxide may be supplied through the gas introducing pipe 309 into the first electrolytic solution 307 to dissolve a sufficient amount of carbon dioxide in the first electrolytic solution 307.

Carbon dioxide contained in the first electrolytic solution 307 is reduced on the cathode 301 to produce at least one of formic acid, carbon monoxide, hydrocarbons, alcohols, and aldehydes.

EXAMPLES

The following will describe, in more detail, the carbon dioxide reducing method and carbon dioxide reducing cell according to embodiments of the present disclosure by way of working examples.

Example 1

A used conductive substrate was a low resistive single-crystal gallium nitride substrate (thickness: about 0.4 mm).

A first semiconductor layer was produced through the following process.

A used n-GaN layer was an $n^+$-type low resistive GaN layer doped with silicone (thickness: 3.0 μm; doped silicon amount: $4.0 \times 10^{18}$ atoms/cm$^3$). A used $Al_xGa_{1-x}N$ layer was an $Al_{0.1}Ga_{0.9}N$ layer (thickness: 100 nm; x=0.10).

The n-GaN layer was allowed to grow onto the single-crystal gallium nitride substrate by a metal organic vapor phase epitaxy. The AlGaN layer was allowed to grow onto the n-GaN layer by a metal organic vapor phase epitaxy.

Thereafter, a plurality of nickel oxide fine particles (fine particle size: several tens nanometers to several micrometers) were dispersed and distributed onto the AlGaN layer.

A second semiconductor layer was produced by introducing an impurity showing p-type conductivity into the front surface of a single-crystal n-type silicon substrate.

An electrode part (thickness: about 500 nm) was formed onto a partial area of the impurity-introduced surface. The electrode part was a laminate of titanium/aluminum/gold.

The conductive substrate on which the first semiconductor layer was formed by the above-mentioned method was joined to the second semiconductor layer having the pn junction structure with the electrode part interposed therebetween. In this way, an anode as shown in FIG. 1C was obtained.

A used cathode was a copper plate (thickness: 0.5 mm). The area of the copper plate that was immersed in a first electrolytic solution was about 4 cm$^2$.

The afore-mentioned anode and cathode were used to produce a carbon dioxide reducing apparatus as illustrated in FIG. 3. The distance between the anode and the cathode was about 8 cm. The other structural elements of the carbon dioxide reducing apparatus are as follows:

first electrolytic solution: an aqueous potassium chloride solution having a salt concentration of 3.0 mol/L;

second electrolytic solution: an aqueous sodium hydroxide solution having a salt concentration of 5.0 mol/L;

proton exchange membrane: a Nafion membrane (Nafion 117, manufactured by DuPont); and light source: a xenon lamp (power: 300 W; light irradiating area: about 4 cm$^2$).

Carbon dioxide gas was supplied through the gas introducing pipe 309 into the first electrolytic solution for 30 minutes. The anode chamber had a light irradiating window (not illustrated). Through the light radiating window, the front surface of the anode was irradiated with light radiated from the light source 303 for a predetermined period. The light had wavelengths of from 250 nm or more to 800 nm or less and had a broad spectrum.

Comparative Example 1

The same process as in example 1 was performed except that no second semiconductor layer was formed in the anode.

In each of example 1 and comparative example 1, when the front surface of the anode was irradiated with light, it was observed that a reaction current flowed into the conductive wire. On the other hand, when the irradiation of the light was interrupted, it was observed that no reaction current flowed into the conductive wire. This means that by the irradiation of the light, some reaction was caused in the anode and the cathode.

The reaction current amount of example 1 was about two times that of comparative example 1. Moreover, example 1 has photoelectromotive force generated in the anode by the light irradiation higher than photoelectromotive force of comparative example 1 in absolute value.

The inventors examined the situation of the carbon dioxide reduction in detail as follows. Specifically, the anode according to example 1 was irradiated with light in the state that the cathode chamber was sealed, that is, the state that carbon dioxide was air-tightly sealed thereinto. By the light irradiation, carbon dioxide was reduced in the cathode chamber. Regarding the kind and amount of reaction products generated by the reduction of carbon dioxide, gas components, out of these products, were measured by gas chromatography while liquid components were measured by liquid chromatography and headspace gas chromatography.

From the results of the above, it was found out in each of example 1 and comparative example 1 that carbon monoxide, formic acid and others were produced in the cathode chamber. The amount of each of the reaction products was increased in proportion with the period for the light irradiation.

According to the above, it has been found that a catalytic reaction for reducing carbon dioxide is generated in the cathode by irradiating the anode with light.

The reaction product amount of example 1 was compared with that of comparative example 1. As a result, the amount of example 1 was two times that of comparative example 1. In conclusion, it was found out that by using an anode in which a first semiconductor layer and a second semiconductor layer are stacked onto each other, the reaction current amount is made about two times larger and further the reaction product amount is also made about two times larger so that carbon dioxide is efficiently reduced.

The reaction products of example 1 were compared with those of comparative example 1. As a result, comparative example 1 mainly gave formic acid as a reaction product. However, example 1 gave hydrocarbons such as methane and ethylene, alcohols such as ethanol, and aldehydes such as acetaldehyde. In conclusion, it have found out that by using an anode in which a first semiconductor layer made of a nitride semiconductor and a second semiconductor layer having a pn junction structure are stacked onto each other, organic substances more complicated in structure than formic acid can be obtained. The organic substances obtained in example 1 were organic substances each having a complicated structure; thus, the substances were substances which were not easily obtained as reduction products from carbon dioxide by only optical energy.

Furthermore, a more detailed investigation was made about the reaction products obtained in each of example 1 and comparative example 1.

Figure 4:
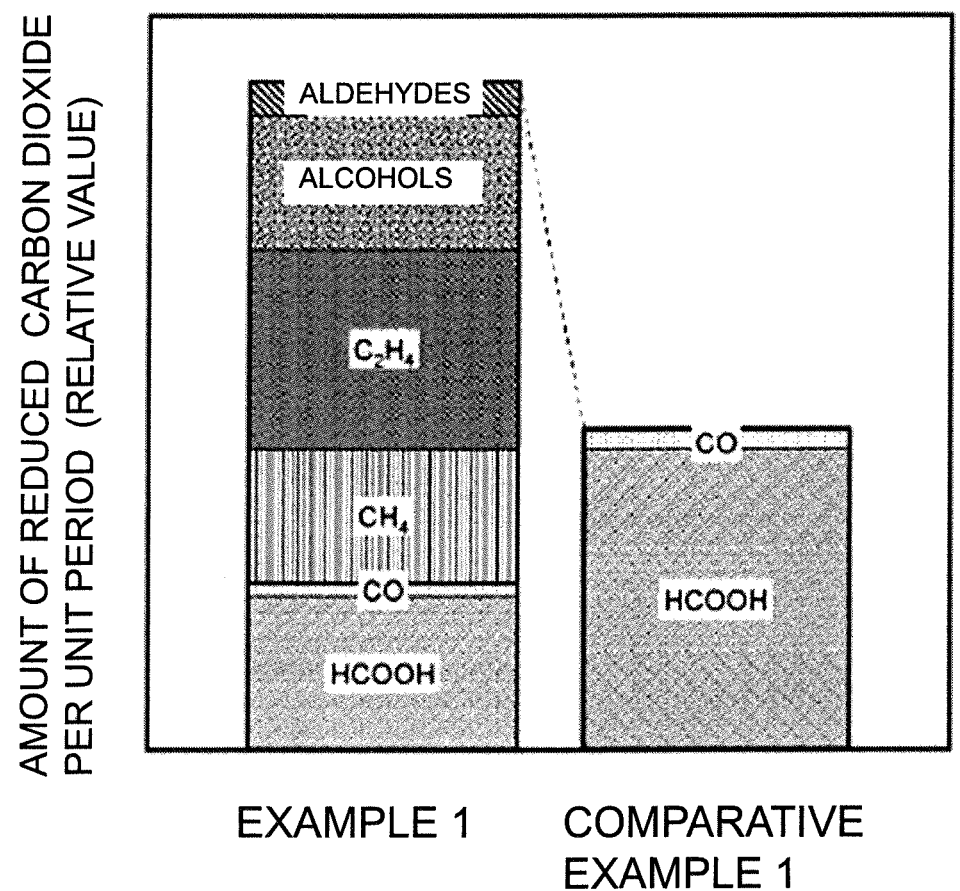
FIG. 4 is a graph showing results of example 1 and comparative example 1.

FIG. 4 is a graph showing the respective amounts of the reaction products obtained in each of example 1 and comparative example 1. FIG. 4 shows a graph in which the reaction product amounts obtained in comparative example 1 are used as standards to show the reaction product amounts obtained in example 1 relatively. The amount of reduced carbon dioxide per unit period is equivalent to the amount of the reaction products per unit period.

As shown in FIG. 4, main one of the reaction products in comparative example 1 was formic acid. By contrast, as shown in FIG. 4, the reaction products in example 1 were ethylene, methane, formic acid, alcohols, and aldehydes, the respective amount of which became lower in a compound-described order herein.

In the present specification, the word "alcohols" denotes methanol, ethanol, isopropanol, and allyl alcohol. In the specification, the word "aldehydes" denotes acetaldehyde and propionaldehyde.

The reaction products in example 1 included some compounds absent as the reaction products in comparative example 1, that is, methane, ethylene, methanol, ethanol, isopropanol, ally alcohols, acetaldehyde, and propionaldehyde. In conclusion, the use of the carbon dioxide reducing method of the present disclosure made it possible to produce organic substances each having a more complicated structure by optical energy.

Example 2

The same process as in example 1 was performed except that the following was used as the cathode: an electrode in which a plurality of copper fine particles were dispersed and distributed on a substrate made of glassy carbon (registered trademark).

As a result, it was observed that by irradiating the anode with light, a reaction current flowed into the conductive wire. The observed current amount was substantially equal to that in example 1. It was also observed that reduction products obtained from carbon dioxide were reaction products equivalent to those in example 1.

Also, in the case of using a copper nickel alloy containing a trace amount of nickel instead of the copper fine particles to produce an electrode, substantially the same results as in the case of using only the copper fine particles were obtained regarding the resultant current amount and reduction products from carbon dioxide.

Example 3

The same process as in example 1 was performed except that the first electrolytic solution was changed to an aqueous potassium bicarbonate solution.

As a result, it was observed that by irradiating the anode with light, a reaction current flowed into the conductive wire. The observed current amount was substantially equal to that in example 1.

Also, in the case of changing the first electrolytic solution to an aqueous sodium chloride solution, substantially the same results as in the case of using the aqueous potassium chloride solution were obtained regarding the resultant current amount and reduction products from carbon dioxide.

Example 4

The same process as in example 1 was performed except that the light from the light source was changed to pseudo sunlight or sunlight.

As a result, it was observed that by irradiating the anode with pseudo sunlight or sunlight, a reaction current flowed into the conductive wire. Moreover, as reduction products from carbon dioxide, hydrocarbons such as methane, and alcohols such as ethanol were obtained.

Example 5

The same process as in example 1 was performed except that a pn junction structure made of gallium arsenic and a pn junction structure made of silicon (Si) were stacked onto each other as the second semiconductor layer.

As a result, it was observed that by irradiating the anode with light, a reaction current flowed into the conductive wire. The observed reaction current amount was larger than that in example 1. Regarding reduction products from carbon dioxide in this example, the proportion of hydrocarbons or alcohols was larger than that of example 1.

Example 6

The same process as in example 1 was performed except that an indium plate was used as the cathode.

Comparative Example 2

The same process as in example 6 was performed except that the second semiconductor layer was not formed onto the anode.

In each of example 6 and comparative example 2, it was observed that by irradiating the front surface of the anode with light, a reaction current flowed into the conductive wire.

The reaction current amount in example 6 was equivalent to that in example 1, and was about two times that in comparative example 2.

In each of example 6 and comparative example 2, substantially the whole of reduction products from carbon dioxide was formic acid. In conclusion, it was verified that the use of indium for the cathode selectively produces formic acid.

Figure 5:
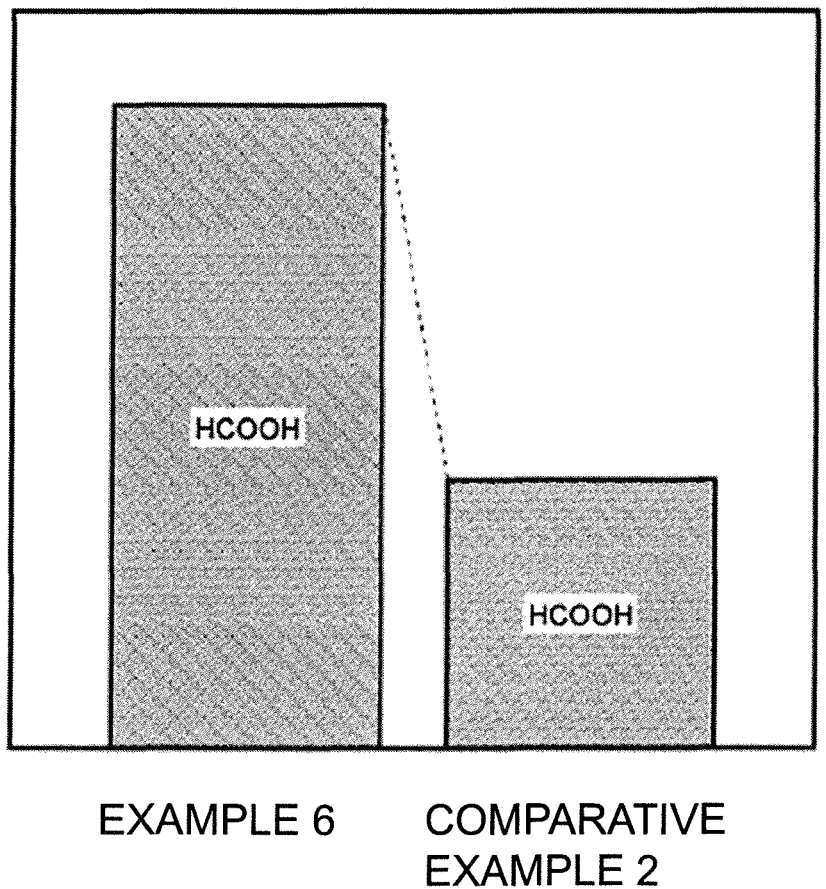
FIG. 5 is a graph showing results of example 6 and comparative example 2.

FIG. 5 is a graph showing the respective amounts of the reaction products obtained in each of example 6 and comparative example 2. FIG. 5 shows a graph in which the reaction product amounts obtained in comparative example 2 are used as standards to show the reaction product amounts obtained in example 6 relatively. The amount of reduced carbon dioxide per unit period is equivalent to the amount of the reaction products per unit period.

As shown in FIG. 5, main one of the reaction products in each of example 6 and comparative example 2 was formic acid. However, the amount of formic acid produced in example 6 was about two or more times that of formic acid produced in comparative example 2. In conclusion, it was verified that the use of the carbon dioxide reducing method of the present disclosure makes it possible to reduce carbon dioxide highly efficiently on the cathode.

Example 7

The same process as in example 6 was performed except that a gold plate was used as the cathode.

As a result, it was observed that by irradiating the anode with light, a reaction current flowed into the conductive wire. The observed reaction current amount was substantially equivalent to that in example 6.

Substantially the whole of the reaction products from carbon dioxide was carbon monoxide. In conclusion, it was verified that the use of gold for the cathode selectively produces carbon monoxide. The amount of carbon monoxide produced in example 7 was two or more times that of carbon monoxide obtained through the same process as in comparative example 2 except that a gold plate was used as the cathode.

It was verified that when a silver plate was used instead of the gold plate as the cathode, carbon monoxide was selectively and highly efficiently produced, as well.

As described above, it was found out that when an anode has constitution in which a first semiconductor layer made of a nitride semiconductor is stacked on a second semiconductor layer having a pn junction structure, the reaction current amount generated by irradiating the anode with light is increased. It was also verified that in the cathode, carbon dioxide is reduced by optical energy.

It was found out that the use of indium for the cathode selectively produces formic acid as a reduction product from carbon dioxide. It was found out that the production amount thereof is more efficiently than the case where no second semiconductor layer is formed on the anode.

It was found out that the use of gold or silver for the cathode selectively produces carbon monoxide as a reduction product from carbon dioxide. It was found out that the production amount thereof is more efficiently than the case where no second semiconductor layer is formed on the anode.

It was found out that the use of copper for the cathode highly efficiently gives, as reduction products from carbon dioxide, organic substances having a more complicated structure than formic acid, which is likewise produced.

Embodiment 2

Finding on which the Present Disclosure is Based

The inventors have found out that a mechanism for tracking sun is used to allow a carbon dioxide reducing cell to face to sun, and a light-concentrating device is used to irradiate the anode (photochemical electrode) of this cell with light, the energy density of which is heightened per unit area, thereby increasing the advantageous effects of the cell.

A carbon dioxide reducing method according to embodiment 2 of the present disclosure has been made on the basis of this finding.

Referring to the attached drawings, the following will describe a carbon dioxide reducing cell, and a carbon dioxide reducing apparatus according to embodiment 2 as well as the carbon dioxide reducing method according to embodiment 2. A description may be omitted regarding each of substantially the same constitutions and effects as in the carbon dioxide reducing cell and carbon dioxide reducing method according to embodiment 1.

<Anode (Photochemical Electrode)>

An anode 30A, 30B, 30C, 30D, 35A or 35B (referred to also as a "photochemical electrode" hereinafter) constituting the carbon dioxide reducing cell according to embodiment 2 has substantially the same constitution and effect as the anode constituting the carbon dioxide reducing cell according to embodiment 1. The anodes 30A, 30B, 30C, 30D, 35A and 35B may each receive sunlight as light to be irradiated.

FIG. 6A illustrates a basic structure of the anode (photochemical electrode) 30A. The anode 30A has a stacked structure having, from a light-irradiated surface side thereof, a first semiconductor layer 11 made of a nitride semiconductor material, a conductive substrate 15, and a second semiconductor layer 12 having a pn junction structure. The anode 30A has, in addition to this structure, an electrode part 16 through which the conductive substrate 15 and the second semiconductor layer 12 are electrically connected to each other, and a terminal electrode part 17.

The first semiconductor layer 11 is composed of $Al_xGa_{1-x}N$ layer 13 wherein $0 \leq x \leq 0.25$ (referred to also as an "AlGaN layer" hereinafter), and an n-type GaN layer 14 (referred to also as an "n-GaN layer" hereinafter).

The second semiconductor layer 12 has a pn junction structure, and is electrically connected, through its p-type semiconductor layer, to the n-GaN layer 14 side of the first semiconductor layer 11.

The method for producing the anode 30A is not limited, and may be generally a first method or a second method described below.

In the first method, first, the n-GaN layer 14 and the AlGaN layer 13 are formed in this order as the first semiconductor layer 11 onto one of the two surfaces of the conductive substrate 15 as a base. Next, the second semiconductor layer 12, which has a pn junction structure, is formed onto the other surface of the conductive substrate 15 with the electrode part 16 interposed therebetween. The formation of the p-type semiconductor layer of the second semiconductor layer 12 is attained onto the electrode part 16 side of the workpiece. Thereafter, the terminal electrode part 17 is added onto the n-type semiconductor layer of the second semiconductor layer 12. In this way, the anode 30A can be produced.

In the second method, first, the n-GaN layer 14 and the AlGaN layer 13 are formed in this order as the first semiconductor layer 11 onto one of the two surfaces of the conductive substrate 15 as a base. Next, a separately produced structural body composed of the second semiconductor layer 12, which has a pn junction structure, is electrically connected through the electrode part 16 onto the other surface of the conductive substrate 15. Thereafter, the terminal electrode part 17 is added onto the n-type semiconductor layer of the second semiconductor layer 12. In this way, the anode 30A can be produced. In the anode 30A produced by the second method, the electrode part 16 is arranged onto portions of the other surface of the conductive substrate 15 and portions of one of the surfaces of the p-type semiconductor layer of the second semiconductor layer 12.

The terminal electrode part 17 is a connecting terminal of the anode 30A, and connected through a conductive wire to a cathode. At this time, the anode 30A and the cathode are electrically connected to each other through no external power source such as potentiostat.

The first semiconductor layer 11, which constitutes the anode 30A and is made of the nitride semiconductor, is generally formed as a thin film. The method for forming this layer is not particularly limited as far as the method makes it possible to form a thin film of the nitride semiconductor onto the conductive substrate 15. The method is, for example, a metal organic vapor phase epitaxy.

Considering that the second semiconductor layer 12 is also needed to be irradiated with light, the conductive substrate 15 is a substrate having translucency. The material of the conductive substrate 15 is, for example, a low resistive single-crystal gallium nitride (GaN) nitride substrate, gallium oxide ($Ga_2O_3$) substrate, silicon carbide (SiC) substrate or zinc oxide (ZnO) substrate.

The electrode part 16 is a metallic layer in a thin film form, and is produced by, for example, a vacuum deposition method. When the conductive substrate 15 and the second semiconductor layer 12 are electrically connected to each other without causing any loss, the electrode part 16 may be omitted to connect the conductive substrate 15 and the second semiconductor layer 12 directly to each other.

The following describes a basic function of the anode 30A, which is a photochemical electrode.

When a surface area of the anode 30A is irradiated with sunlight, light having a wavelength absorbable into the AlGaN layer 13 region constituting the first semiconductor layer 11 is absorbed, so that photoexcitation is caused. The light having the wavelength absorbable into the AlGaN layer 13 region is light having a wavelength of 365 nm or less.

Holes and electrons generated by the photoexcitation contribute to redox reaction. Specifically, holes generated inside the AlGaN layer 13 by the photoexcitation are shifted onto the front surface of the anode 30A to oxidize water contacting the anode 30A, so that oxygen is produced. In short, the anode 30A functions as an oxygen producing electrode.

The band gap value of the AlGaN layer 13, that is, the forbidden band width thereof is 3.4 eV or more. It is therefore necessary to irradiate the AlGaN layer 13 with light having a wavelength of 365 nm or less in order to use the AlGaN layer 13 as a photochemical electrode using light. For this necessity, from the viewpoint of efficient use of light, the component ratio of Al contained in the $Al_xGa_{1-x}N$ layer 13, i.e., the value x preferably satisfies the range of $0 \leq x \leq 0.25$, and more preferably satisfies the range of $0.05 \leq x \leq 0.15$.

The thickness of the region of the AlGaN layer 13 where the light having a wavelength within the above-mentioned wavelength range is absorbed inside the AlGaN layer 13, that is, the depth from the front surface of the AlGaN layer 13 is about 100 nm. The thickness of this absorption region may be selected dependently also on the band gap value of the AlGaN layer 13. The direction of this distance is parallel to the thickness direction of the AlGaN layer 13. Thus, the AlGaN layer 13 has a thickness of, for example, from 70 nm or more to 1000 nm or less. The AlGaN layer 13 may have a thickness of from 80 nm or more to 200 nm or less.

On the other hand, electrons generated inside the AlGaN layer 13 by the photoexcitation are supplied via the n-GaN layer 14 of the first semiconductor layer 11, the conductive substrate 15, and the electrode part 16 to the p-type semiconductor layer of the second semiconductor layer 12. The n-GaN layer 14 may be of an $n^+$-type, in which the electrical resistance component is smaller. When the electrical resistance component of the n-GaN layer 14 becomes small, a loss which follows the transport of the carriers can be decreased. In order to make the n-GaN layer 14 into an $n^+$-type, it is effective to add an impurity into the layer. The impurity to be added is, for example, silicon. The carrier concentration in the $n^+$-type GaN layer 14 to which silicon is added is, for example, $1 \times 10^{18}$ atoms/cm$^3$ or more, and may be from about 2 to $8 \times 10^{18}$ atoms/cm$^3$.

The second semiconductor layer 12 having the pn junction structure is composed of a junction structure composed of a semiconductor layer showing p-type property and a semiconductor layer showing n-type property. The second semiconductor layer 12 may contain a semiconductor layer having i-property between the p-type semiconductor layer and the n-type semiconductor layer. In conclusion, in the present specification, the "pn junction structure" also includes a pin junction structure.

The pn junction structure is generally made of the same material. However, the structure may be made of materials different from each other.

The second semiconductor layer 12 absorbs, out of light rays transmitted through the first semiconductor layer 11 and the conductive substrate 15, light having a wavelength absorbable into the second semiconductor layer 12 to generate excited carriers, and further generate photoelectromotive force. The light having the wavelength absorbable into the second semiconductor layer 12 is, out of light rays of sunlight, mainly light having a wavelength in the range of from visible rays to infrared rays (about 300 to 2000 nm). When the second semiconductor layer 12 is composed of, for example, silicon, the second semiconductor layer 12 can absorb light as far as the light has a wavelength of about 1100 nm or less. When the second semiconductor layer 12 is made of germanium, the second semiconductor layer 12 can absorb light as far as the light has a wavelength of about 1800 nm or less.

The holes excited by the light irradiation onto the second semiconductor layer 12 are recombined with the electrons supplied from the first semiconductor layer 11 side, while the electrons excited in the second semiconductor layer 12 are collected into the terminal electrode part 17 arranged in the anode 30A. The electrons collected in the terminal electrode part 17 are supplied, through a conducting wire electrically connected to the part, to the cathode side for reducing carbon dioxide.

The potential supplied to the cathode is the sum of the photoelectromotive force generated in the first semiconductor layer 11 and that generated in the second semiconductor layer 12. In other words, by using the anode 30A in which the first semiconductor layer 11 and the second semiconductor layer 12 are stacked onto each other, the photo voltaic power generated by light irradiation can be improved. As a result, the reducing efficiency of carbon dioxide in the cathode is improved, and further at least one of the following products can be obtained as a reduction product of carbon dioxide: carbon monoxide, formic acid, methane, ethylene, methanol, ethanol, and isopropanol.

FIG. 6B is a sectional view illustrating the anode 30B in which a first semiconductor layer 11 and a second semiconductor layer 12 are joined with each other through a transparent conductive layer 19 instead of the electrode part 16 in FIG. 6A. The constitution of the anode 30B is not limited as far as the first semiconductor layer 11 and the second semiconductor layer 12 are electrically connected to each other and the second semiconductor layer 12 is irradiated with light transmitted through the first semiconductor layer 11.

As illustrated in FIG. 6C and FIG. 6D, in order to heighten the anodes 30C and 30D in oxygen generating efficiency and endurance, a plurality of nickel oxide fine particles 18 may be dispersed on the front surface of their AlGaN layer 13.

Figure 7A:
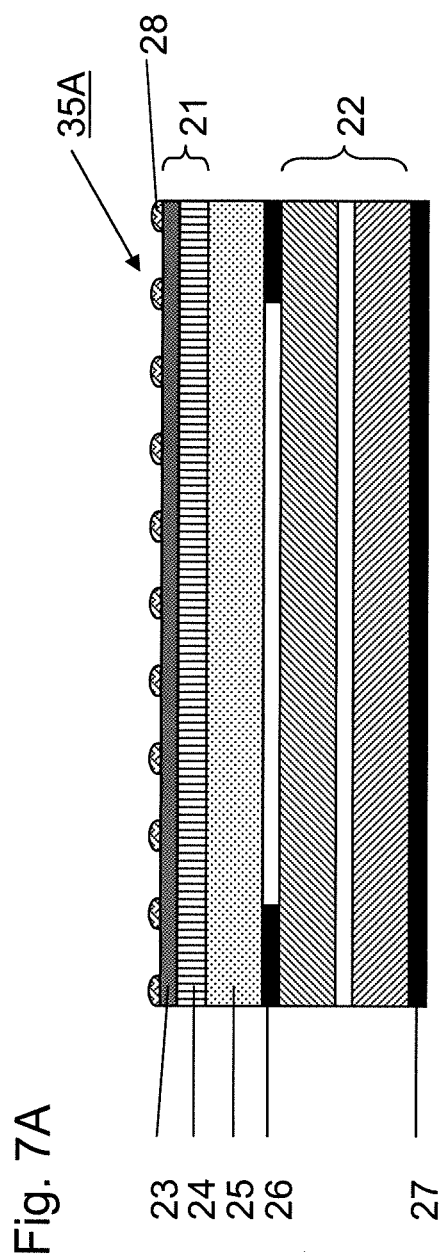
FIG. 7A is a sectional view illustrating a different anode according to embodiment 2.
Figure 7B:
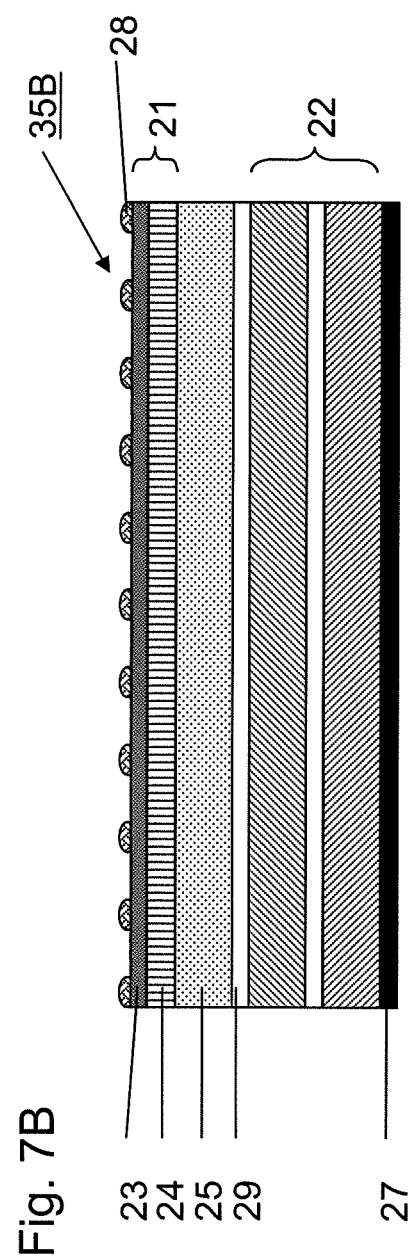
FIG. 7B is a sectional view illustrating a different anode according to embodiment 2.

FIG. 7A and FIG. 7B are respective sectional views of the anodes 35A and 35B, which are each composed of a second semiconductor layer 22 having a plurality of pn junction structures. Examples of a combination of materials for each of the pn junction structures, which constitute the second semiconductor layer 22, include gallium arsenic (GaAs) and silicon (Si), amorphous silicon (a-Si) and crystalline silicon (c-Si), and the like. The combination of the materials of each of the pn junction structures, which constitute the second semiconductor layer 22, is not limited as far as a combination of materials has a band gap making it possible to absorb effectively light transmitted through the first semiconductor layer 21.

<Carbon Dioxide Reducing Cell>

Figure 8:
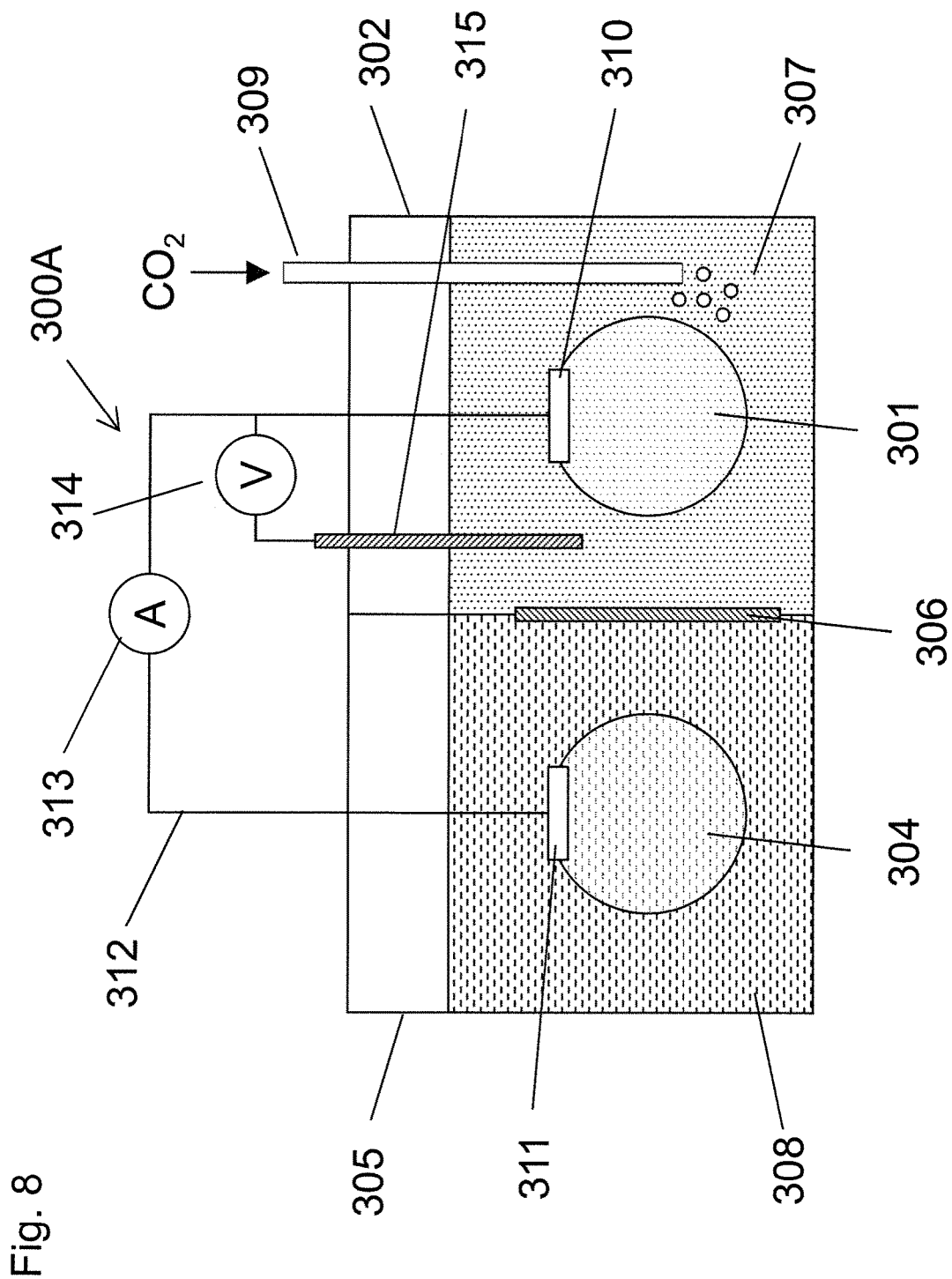
FIG. 8 is a schematic view of a carbon dioxide reducing cell according to embodiment 2 for obtaining a reaction for reducing carbon dioxide, using sunlight.

FIG. 8 is a schematic view illustrating a carbon dioxide reducing cell 300A. The carbon dioxide reducing cell 300A has a cathode chamber 302, an anode chamber 305, and a proton exchange membrane 306.

Inside the cathode chamber 302, a first electrolytic solution 307 is held, and further the cathode chamber 302 has a cathode 301. The cathode 301 contacts the first electrolyte 307. Specifically, the cathode 301 is immersed in the first electrolytic solution 307.

The first electrolytic solution 307 is, for example, an aqueous potassium bicarbonate solution, aqueous sodium bicarbonate solution, aqueous potassium chloride solution or aqueous sodium chloride solution. In the case of each of these aqueous solutions, the salt concentration in the first electrolytic solution is, for example, 1 mol/L or more, and may be 3 mol/L or more.

The first electrolytic solution 307 contains carbon dioxide. The concentration of carbon dioxide is not limited. The first electrolytic solution 307 may be acidic in the state that carbon dioxide is dissolved in the first electrolytic solution 307.

A constituent material of the cathode 301 on which carbon dioxide is reduced is a metal or metallic compound. The metal which constitutes the cathode 301 is, for example, copper, gold, silver or indium, or an alloy of one or more of these metals. The metallic compound which constitutes the cathode 301 is, for example, an oxide or chloride of one or more of these metals.

The cathode 301 may be made of one or more of the above-mentioned metals, alloys and metallic compounds, or may be composed of a substrate on which one or more of the above-mentioned metals, alloys and metallic compounds are held. For example, the cathode 301 may be an electrode in which a predetermined metal or metallic compound is formed in a thin film on a substrate made of glass, glassy carbon (registered trademark) or the like. The cathode 301 may be formed by dispersing a plurality of fine particles made of a metal or metallic compound onto a conductive substrate. As illustrated in FIG. 8, at least one portion of the cathode 301 may be immersed in the first electrolytic solution 307.

Inside the anode chamber 305, a second electrolytic solution 308 is held, and further the anode chamber 305 has an anode 304. In the present specification, the anode 304 denotes a photochemical electrode since the anode 304 is irradiated with sunlight.

The anode 304 has a first semiconductor layer made of a nitride semiconductor in which an AlGaN layer and an n-GaN layer are stacked onto each other, and a second semiconductor layer composed of a semiconductor having a pn junction structure. The structure of the anode 304 is, for example, the anode 30A. The anode 304 contacts the second electrolytic solution 308. Specifically, the anode 304 is immersed in the second electrolytic solution 308.

The second electrolytic solution 308 is, for example, an aqueous sodium hydroxide solution. Even when the second electrolytic solution is any aqueous solution, the salt concentration in the solution is, for example, 1 mol/L or more, and may be about 5 mol/L. The second electrolytic solution 308 may be basic.

In order to separate the first electrolytic solution 307 and the second electrolytic solution 308 from each other, the proton exchange membrane 306 is inserted between the cathode chamber 302 and the anode chamber 305. In other words, in the carbon dioxide reducing cell according to embodiment 2 of the present disclosure, the first electrolytic solution 307 and the second electrolytic solution 308 are not miscible with each other.

The proton exchange membrane 306 is not particularly limited as far as substantially only proton permeates through the membrane 306 and none of other substances can permeate through the membrane 306. The proton exchange membrane 306 is made of, for example, Nafion (registered trademark).

The cathode 301 and the anode 304 have an electrode terminal 310 and an electrode terminal 311, respectively. These electrode terminals 310 and 311 are electrically connected to each other through a conductive wire 312. As illustrated in FIG. 8, in order to monitor the reaction current amount flowing between the cathode 301 and the anode 304, an ammeter 313 may be inserted therebetween. However, when the reaction current does not need to be measured, the insertion is not necessarily required. In order to monitor the potential (reaction potential) of the cathode 301 that is applied by light irradiation, a voltmeter 314 and a reference electrode 315 may be set up. The reference electrode is, for example, a silver/silver chloride electrode. However, when the reaction potential does not need to be measured, the setting-up is not necessarily required. Thus, the cathode 301 and the anode 304 are directly connected to each other through the conductive wire. In other words, between the electrode terminals 310 and 311, an external power source such as a battery or potentiostat is not electrically sandwiched.

As illustrated in FIG. 8, the carbon dioxide reducing cell 300A may have a gas introducing pipe 309. An end of the gas introducing pipe 309 is immersed in the first electrolytic solution 307. Through the gas introducing pipe 309, carbon dioxide gas is supplied to the first electrolytic solution 307.

As will also be described later, a surface area of the anode 304 immersed in the second electrolytic solution 308 is irradiated with sunlight concentrated by the light-concentrating device. As a result, electrons generated in the anode 304 are supplied to the cathode 301 through the conductive wire 312 electrically connected to the electrodes. By the effect of the cathode 301, carbon dioxide contained in the first electrolytic solution 307 is reduced.

At this time, carbon dioxide contained in the first electrolytic solution 307 may be reduced while carbon dioxide is supplied through the gas introducing pipe 309 into the first electrolytic solution 307. Before the start of the reducing treatment of carbon dioxide by the light irradiation, carbon dioxide may be supplied through the gas introducing pipe 309 into the first electrolytic solution 307 to dissolve a sufficient amount of carbon dioxide in the first electrolytic solution 307.

<Carbon Dioxide Reducing Apparatus>

Figure 10:
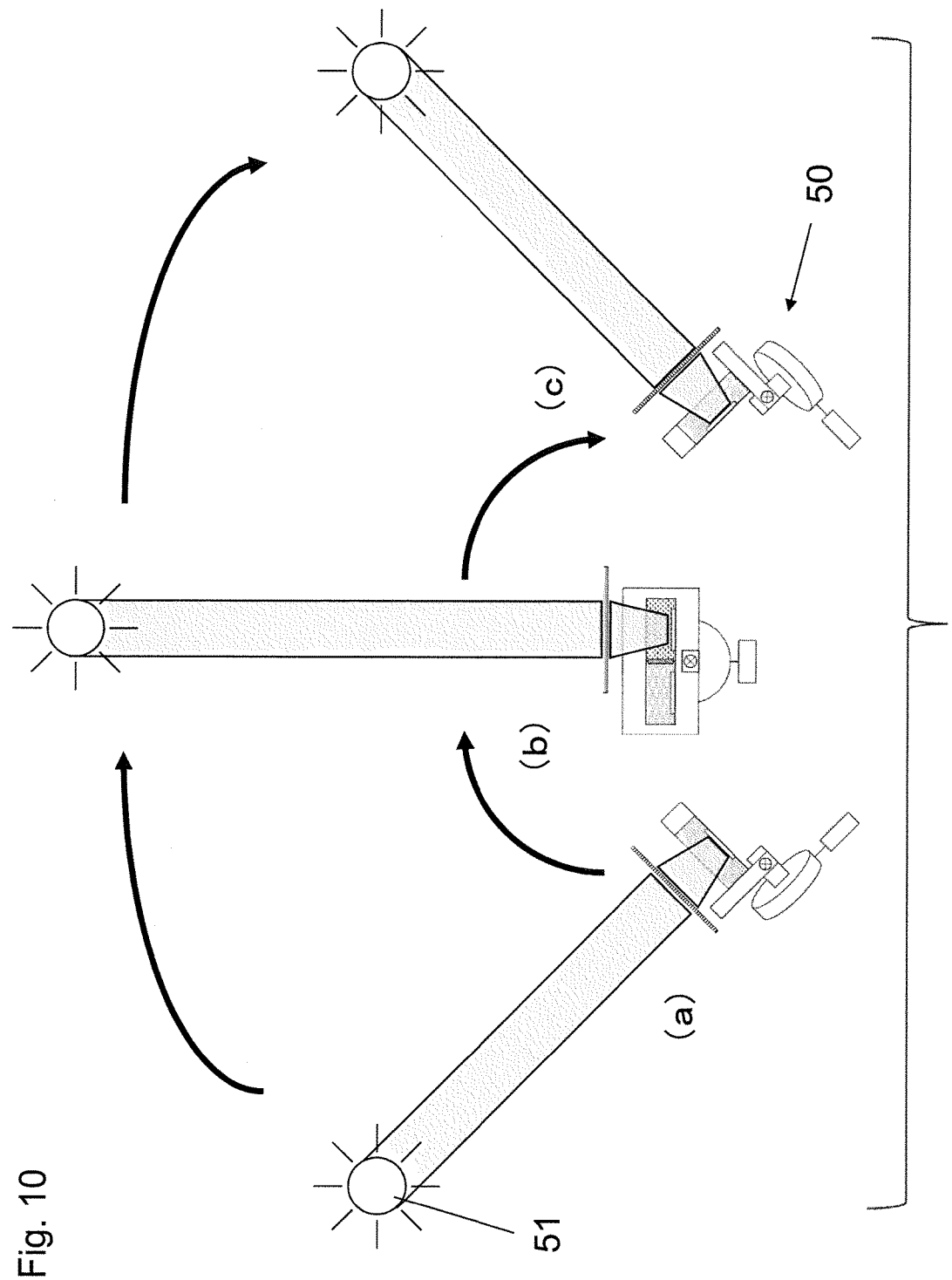
FIG. 10 is a schematic view showing that a carbon dioxide reducing apparatus according to embodiment 2 tracks sun as illustrated in portions (a), (b) and (c) in isolation.
Figure 11:
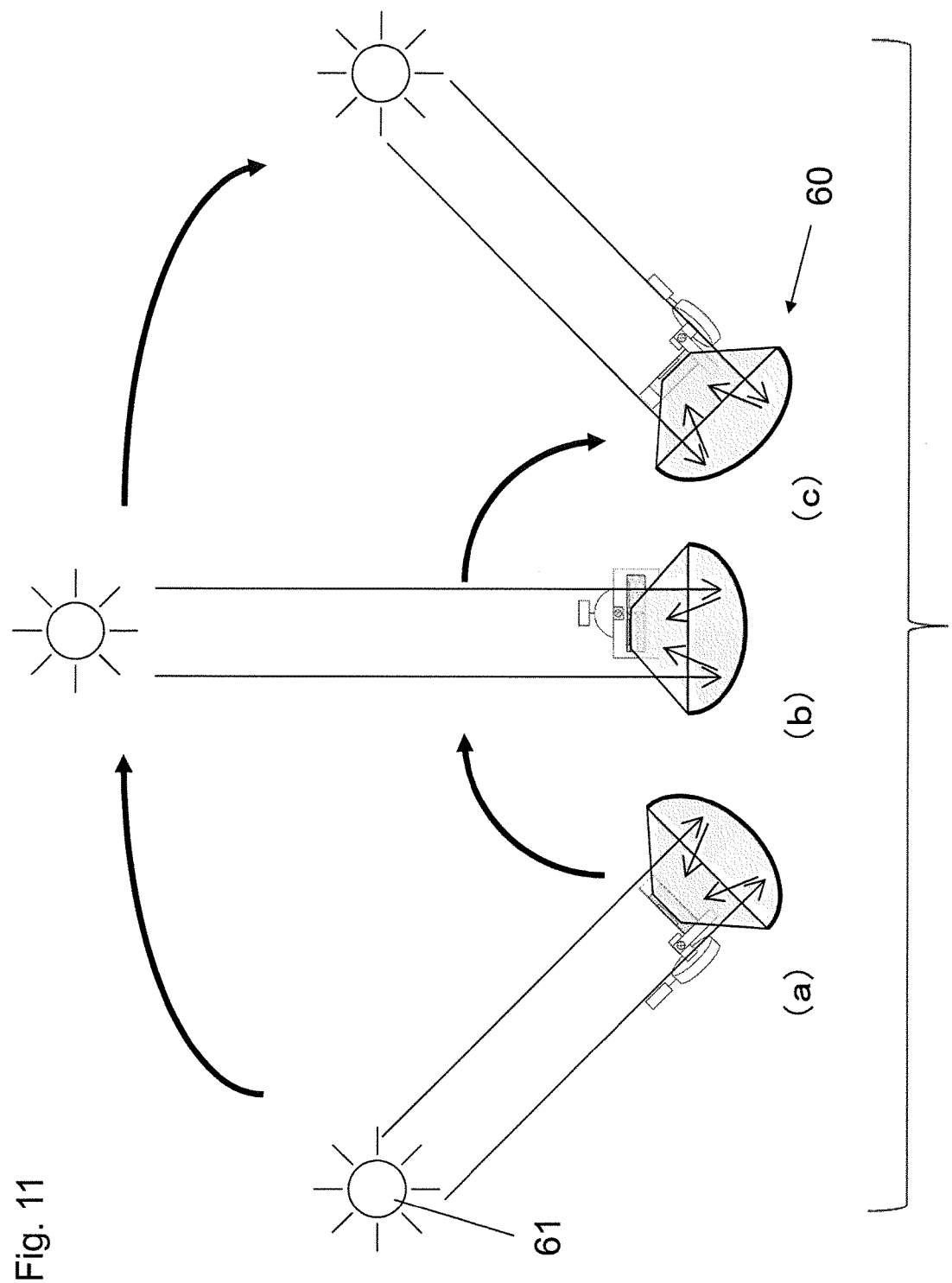
FIG. 11 is a schematic view showing that another carbon dioxide reducing apparatus according to embodiment 2 tracks sun as illustrated in portions (a), (b) and (c) in isolation.

FIGS. 9A and 9B are, respectively, a schematic side view and a schematic plan view illustrating an example of a carbon dioxide reducing apparatus 40 having a carbon dioxide reducing cell, a sun tracking device, and a light-concentrating device. The schematic side view of FIG. 9A is obtained by viewing the carbon dioxide reducing apparatus from a side thereof. The schematic plan view of FIG. 9B is obtained by viewing the apparatus from above the top thereof. The carbon dioxide reducing apparatus 40 has a carbon dioxide reducing cell 41, a sun tracking device 42, and a light-concentrating device 43. FIG. 10 is a schematic view showing that a carbon dioxide reducing apparatus according to embodiment 2 tracks sun as illustrated in portions (a), (b) and (c) in isolation. FIG. 11 is a schematic view showing that another carbon dioxide reducing apparatus according to embodiment 2 tracks sun as illustrated in portions (a), (b) and (c) in isolation.

The carbon dioxide reducing cell 41 is a photo-electrochemical cell having an anode 48 to be irradiated with sunlight, and a cathode 49 for reducing carbon dioxide, and is, for example, the carbon dioxide reducing cell 300A illustrated in FIG. 8.

FIG. 10 and FIG. 11 show views illustrating respective relationships between the facing direction of the carbon dioxide reducing cell 41 set in the sun tracking device 42 and the movement of the sun represented by numeral sign 51, and between the same and the movement of the sun represented by numeral sign 61.

The sun tracking device 42 has a stand section 44 that fixes the carbon dioxide reducing cell 44, a driving section 45 that changes the facing direction of the carbon dioxide reducing cell 41, and a control section 46 that controls the facing direction of the carbon dioxide reducing cell 41 in accordance with the movement of the sun.

Through the mechanism of the driving section 45, the carbon dioxide reducing cell 41 set onto the stand section 44 is moved in a rotational direction (corresponding to the azimuth) and an angular direction (corresponding to the elevation angle) so that the front of the cell can be varied to be along an arbitrary direction and have an arbitrary angle. The control section 46 controls the movement of the driving section 45 to match the front of the carbon dioxide reducing cell 41 with the position (the azimuth and the elevation angle) of the sun at the time of the control, so that the carbon dioxide reducing cell 41 faces to the sun. The controlling is performed on the basis of commands programmed in advance, and values obtained by calculation and measurement. The method for the controlling is not limited. For example, it is advisable that the front of the carbon dioxide reducing cell 41 tracks the sun to make the movement of the cell 41 consistent with the trace of the sun, which changes with the lapse of time, so that the cell 41 faces to the sun (see the portions (a), (b) and (c) of FIG. 10, and those of FIG. 11). The portion (a) of FIG. 10 and that of FIG. 11 each correspond to a position of the sun in the morning; the portion (b) of FIG. 10 and that of FIG. 11 each correspond to a position of the sun in the daytime (the meridian sun); and the portion (c) of FIG. 10 and that of FIG. 11 each correspond to a position of the sun in the evening.

The sun tracking device 42 is not necessarily limited to any device capable of allowing the front of the carbon dioxide reducing cell 41 to face precisely to the sun. Additionally, for example, the front of the carbon dioxide reducing cell 41 may be shifted from the sun-facing direction. For example, when more intense light than standard sunlight (AM: 1.5) is incident, the front of the cell 41 may be shifted from the sun-facing direction.

The light-concentrating device 43 is a device for concentrating sunlight 47 to be irradiated to the carbon dioxide reducing cell 41 to increase the optical energy density per unit area. Specific examples of the light-concentrating device 43 include, but are not limited to, a biconvex lens, a planoconvex lens, a Fresnel lens (FIG. 10), a concave mirror (FIG. 11) and the like. When such a lens or mirror is used to concentrate sunlight, the concentration degree thereof is not particularly limited; the energy density may be heightened about 2 to 100 times, in particular, about 5 to 50 times. In other words, it is allowable that light having an energy density of from 200 mW/cm$^2$ to 100 W/cm$^2$, particularly, from 500 mW/cm$^2$ to 5 W/cm$^2$, which is higher than the energy density (100 mW/cm$^2$) of standard sunlight (AM: 1.5), is appropriately selected, and then the anode 48 is irradiated with the selected light. At this time, it is not necessarily indispensable to select the positional distance between the light-concentrating device 43 and the carbon dioxide reducing cell 41 so that the cell 41 is set onto the focal point position of the device 43. It is sufficient to select the distance between the light-concentrating device 43 and the carbon dioxide reducing cell 41 in such a manner that the cell 41 can gain a predetermined irradiation area. In the case where, for example, a Fresnel lens having a focal distance of 200 mm and a diameter of 200 mm is used to concentrate light in its area having a diameter of 50 mm and then the front surface of the anode 48 is irradiated with the concentrated light, the positional distance is about 150 mm and the concentration degree is about 16 times.

In the case of using, as the light-concentrating device 43, a biconvex lens, planoconvex lens, or Fresnel lens, the sun, the light-concentrating device (Fresnel lens) 43 and the carbon dioxide reducing cell 41 are arranged in this order (FIG. 10). On the other hand, in the case of using, as the light-concentrating device 43, a concave mirror, the sun, the carbon dioxide reducing cell 41 and the light-concentrating device (concave mirror) 43 are arranged in this order (FIG. 11). In short, the front of the carbon dioxide reducing cell 41 is arranged to allow the cell 41 to face to sunlight concentrated by the light-concentrating device 43.

The light irradiated, through the light-concentrating device 43, to a predetermined area of the front surface of the anode 48 of the carbon dioxide reducing cell 41 may be shifted inside the front surface of the anode 48 at predetermined-period intervals. In this case, by shifting the pursuit according to the sun tracking device 42 from the sun-facing direction, the above-mentioned light-irradiated area may be shifted inside the front surface of the anode 48. Furthermore, the light-irradiated area may be shifted to make the irradiated light even inside the anode 48. The light-irradiated area may be shifted in a spiral manner inside the front surface of the anode 48.

<Carbon Dioxide Reducing Method>

The following describes a carbon dioxide reducing method using the carbon dioxide reducing apparatus 40.

The carbon dioxide reducing apparatus 40 may be put at room temperature under the atmospheric pressure. In the state that carbon dioxide gas is beforehand dissolved in the first electrolytic solution in the carbon dioxide reducing cell 41 constituting the carbon dioxide reducing apparatus 40, or while carbon dioxide gas is supplied into the first electrolytic solution, the front surface of the anode 48 constituting the carbon dioxide reducing cell 41 is irradiated with sunlight through the light-concentrating device 43. As illustrated in FIG. 10 and FIG. 11, the sun tracking device 42 is used to control the facing direction of the carbon dioxide reducing cell 41 in accordance with the sun, which shifts with the lapse of time, and the anode 48 is irradiated with concentrated sunlight 47 for a predetermined period. In this way, carbon dioxide contained in the first electrolytic solution 306 is reduced on the cathode 49 or 301 to produce at least one of formic acid, carbon monoxide, hydrocarbons, and alcohols.

EXAMPLES

The following describes, in more detail, the carbon dioxide reducing method and the carbon dioxide reducing cell according to embodiment 2 of the present disclosure by way of working examples.

Example 8

A used conductive substrate constituting an anode of a carbon dioxide reducing cell was a low resistive single-crystal gallium nitride substrate (thickness: about 0.4 mm). A first semiconductor layer was formed onto this conductive substrate through the following process.

First, an n-GaN layer was allowed to grow onto the single-crystal gallium nitride substrate by a metal organic vapor phase epitaxy. This n-GaN layer was a low resistive n-GaN layer doped with silicone to be made into an n$^+$-type (thickness: about 3.0 μm; doped silicon amount: $4.0 \times 10^{18}$ atoms/cm$^3$). Subsequently, in the same way, an AlGaN layer was allowed to grow onto the GaN layer by a metal organic vapor phase epitaxy. The Al$_x$Ga$_{1-x}$N layer was a layer having a thickness of 100 nm in which the aluminum ratio (x) was 0.10. Thereafter, many nickel oxide fine particles (fine particle size: several tens nanometers to several micrometers) were dispersed and distributed onto the AlGaN layer.

A second semiconductor layer was produced to have a pn junction structure of silicon by introducing an impurity showing p-type conductivity into the front surface of a single-crystal n-type silicon substrate. An electrode part (thickness: about 500 nm) composed of a laminate of titanium/aluminum/gold was formed onto a partial area of the impurity-introduced surface.

The conductive substrate on which the first semiconductor layer was formed by the above-mentioned method was joined to the second semiconductor layer having the pn junction structure with the electrode part interposed therebetween. In this way, an anode as shown in FIG. 6C was obtained.

This anode was set into the carbon dioxide reducing cell 300A as illustrated in FIG. 8, and the anode 48 was irradiated with sunlight concentrated by the light-concentrating device 43 in the state that the anode chamber 305 was filled with a second electrolytic solution (aqueous sodium hydroxide solution having a salt concentration of 5.0 mol/L). A measurement was then performed about the photo voltaic power (open potential) $V_{open}$ induced in the anode.

In the light-concentrating device used in the present example, a Fresnel lens (diameter: 12 cm) was used to concentrate the energy density of sunlight about five times, and the front surface (irradiation area: about 20 cm$^2$) of the anode was irradiated with the concentrated light (concentration degree: about five times).

Comparative Example 3

The same process as in Example 8 was performed except that the light-concentrating device, which was the Fresnel lens, was not used, that is, the front surface of the anode was irradiated with sunlight not concentrated.

As a result, the photo voltaic power ($V_{open}$) in the case of using no light-concentrating device (comparative example 3) was about −2.1 V vs Ag/AgCl. On the other hand, in the case of using the light-concentrating device to concentrate sunlight to heighten the energy density of the irradiated light five times, the photo voltaic power ($V_{open}$) was raised to about −2.3 V vs Ag/AgCl.

In conclusion, it was verified that the use of a light-concentrating device makes the reducing ability of the carbon dioxide reducing cell high. It was also verified that the value thereof is maintained by controlling the facing direction of the carbon dioxide reducing cell in accordance with the movement of the sun.

Example 9

The same anode as in example 8 was used as an anode, and an indium plate (thickness: 0.5 mm) was used as a cathode to form a carbon dioxide reducing cell as illustrated in FIG. 8, and the reducing treatment of carbon dioxide was conducted. The area of the indium plate that was immersed in the first electrolytic solution was about 20 cm$^2$. The distance between the anode and the cathode was about 8 cm.

In example 9, a used first electrolytic solution was an aqueous potassium bicarbonate solution having a concentration of 1.0 mol/L. Carbon dioxide was supplied through the gas introducing pipe 309 into the first electrolytic solution for 30 minutes to dissolve carbon dioxide into the first electrolytic solution. A used second electrolytic solution was an aqueous sodium hydroxide solution having a salt concentration of 5.0 mol/L. A proton exchange membrane that was a Nafion membrane (Nafion 117, manufactured by DuPont) was inserted between the first and second electrolytic solutions to separate these solutions from each other.

The carbon dioxide reducing cell was set into a sun tracking device, and the cell was irradiated with sunlight through a light-concentrating device. Thereafter, the sun tracking device was operated to irradiate the front surface of the anode with concentrated sunlight for about 2 hours in the state that the carbon dioxide reducing cell faced to the sun.

In the light-concentrating device used in the present example, a Fresnel lens (diameter: 120 mm) was used to concentrate the energy density of sunlight about five times, and the front surface (irradiation area: about 20 cm$^2$) of the anode was irradiated with the concentrated light (concentration degree: about five times).

Comparative Example 4

The same process as in Example 9 was performed except that the light-concentrating device (Fresnel lens) was not used. That is, the front surface of the anode was irradiated with sunlight not concentrated.

In each of example 9 and comparative example 4, it was observed that when the front surface of the anode was irradiated with the sunlight, a reaction current flowed into the conductive wire. By contrast, it was observed that when the irradiation of the sunlight was interrupted, no reaction current flowed into the conductive wire. This means that some reaction was caused in the anode and the cathode by the irradiation of the sunlight.

However, there was a difference in current amount. The reaction current value obtained in example 9 was about 24 mA while that in comparative example 4 was about 5 mA. In short, by the concentration of the sunlight, the reaction current that was about five times larger was obtained. Moreover, example 9 was about 0.18 V higher in reaction potential than comparative example 4.

Thus, the kind and amount of reaction products produced in the cathode chamber by carbon dioxide reduction in each of these examples, in which the sunlight was irradiated, were measured by gas chromatography and liquid chromatography.

As a result, in each of example 9 and comparative example 4, it was found out that mainly formic acid was selectively produced in the cathode chamber. It was also verified that the amount of the reaction products obtained from carbon dioxide was increased in proportion with the period of the sunlight irradiation.

It was found out from the above that a catalytic reaction for reducing carbon dioxide is generated on the cathode by irradiating the anode with sunlight.

The respective amounts of the reaction products in example 9 and comparative example 4 were compared with each other through the above-mentioned analysis. The amount in example 9 was about 5.3 times that in comparative example 4. Specifically, the sunlight was concentrated, and the carbon dioxide reducing cell tracked the sun in accordance with the movement of the sun, whereby the reaction current amount became about five times larger and further the reaction potential was also improved so that the production amount of formic acid obtained per unit period became about 5.3 times larger. In short, it was found out that carbon dioxide is efficiently reduced.

According to the selection of indium for the cathode material as in present example 9, an organic substance produced from carbon dioxide was substantially only formic acid. The Faraday efficiency regarding the production of formic acid reached to a value of 90 to 95%.

Example 10

The same anode as in example 8 was used as an anode, and a copper plate (thickness: 0.5 mm) was used as a cathode to conduct the same process as in example 9. In example 10, a used first electrolytic solution was an aqueous potassium chloride solution having a salt concentration of 3.0 mol/L, and a used second electrolytic solution was an aqueous sodium hydroxide solution having a salt concentration of 5.0 mol/L.

Comparative Example 5

The same process as in Example 10 was performed except that the light-concentrating device (Fresnel lens) was not used, that is, the front surface of the anode was irradiated with sunlight not concentrated.

In each of example 10 and comparative example 5, it was observed that when the front surface of the anode was irradiated with the sunlight, a reaction current flowed into the conductive wire. On the other hand, it was observed that when the irradiation of the sunlight was interrupted, no reaction current flowed into the conductive wire.

The reaction current value obtained in example 10 was about five times that in comparative example 5. Moreover, example 10 was about 0.30 V higher in reaction potential than in comparative example 5.

Thus, the kind and amount of reaction products produced in the cathode chamber by carbon dioxide reduction in each of these examples, in which the sunlight was irradiated, were measured by gas chromatography and liquid chromatography.

As a result, in each of example 10 and comparative example 5, it was found out that the following were produced in the cathode chamber: hydrocarbons such as methane and ethylene, and a trace amount of carbon monoxide as gas components; and formic acid, and alcohols such as ethanol as liquid components. It was also verified that the amount of the reaction products obtained from carbon dioxide was increased in proportion with the period of the sunlight irradiation.

It was found out from the above that a catalytic reaction for reducing carbon dioxide is generated on the cathode by irradiating the anode with sunlight.

The respective amounts of the reaction products in example 10 and comparative example 5 were compared with each other by conducting the above-mentioned analysis. As a result, the production amount of the reaction products in example 10 was about five times or more that in comparative example 5. Specifically, when the sunlight was concentrated, and the sun is tracked in accordance with the movement of the sun, the reaction current amount became about five times larger and further the reaction potential was also improved so that the production amount of organic substances obtained per unit period became five times or more. In short, it was found out that carbon dioxide is efficiently reduced.

As to gas components, about 80% of the gas component was composed of hydrocarbons (methane and ethylene) in example 10 and a gas having a concentration about two times higher than that in comparative example 2 was obtained. In short, it was verified that the selectivity of the production of hydrocarbons is heightened.

When attention was paid to liquid components, only formic acid was obtained on the indium electrode in example 9 while the liquid obtained on the copper electrode in example 10 included formic acid but almost all of the liquid was composed of alcohol components (such as methanol, ethanol, and isopropanol). In short, it was demonstrated that the reaction potential is improved so that higher-order reaction products is obtained from carbon dioxide.

Example 11

The same process as in example 10 was performed except that the used cathode was changed to an electrode in which many copper fine particles were dispersed and distributed on a substrate made of glassy carbon (registered trademark).

As a result, it was observed that by irradiating the anode with concentrated sunlight, a reaction current flowed into the conductive wire. It was also observed that the measured reaction current amount was substantially equal to that in example 10. It was also verified that reduction products from carbon dioxide were reaction products equivalent to those in example 10.

In the case of using, instead of the copper fine particles, copper nickel alloy fine particles (Ni content: 5%) to produce a cathode, substantially the same results were obtained in current amount and reduction products from carbon dioxide as in the case of using only the copper fine particles.

Example 12

The same process as in example 10 was performed except that the first electrolytic solution was changed to an aqueous sodium chloride solution.

As a result, it was observed that a reaction current flowed into the conductive wire by irradiating the anode with light. It was also observed that the measured reaction current amount was substantially equal to that in example 10.

Example 13

The same process as in example 9 was performed except that the concentration degree of sunlight to be irradiated was changed.

As a result, it was verified that the reaction current was increased in substantial proportion to the concentration degree of the sunlight. As a reduction product from carbon dioxide, only formic acid was selectively produced.

Example 14

The same process as in example 10 was performed except that the used second semiconductor layer was changed to a layer in which a pn junction structure made of gallium arsenic and a pn junction structure made of silicon (Si) were stacked onto each other.

As a result, it was observed that by irradiating the anode with sunlight, a reaction current flowed into the conductive wire. The measured reaction potential was larger than that in example 10. In reduction products from carbon dioxide, the proportion of hydrocarbons in gas components was increased from that in example 10, and that of alcohols in liquid components was increased therefrom.

Example 15

The same process as in example 9 was performed except that the used cathode was changed to a gold plate.

As a result, it was observed that a reaction current flowed into the conductive wire by irradiating the anode with sunlight. It was also observed that the measured reaction current amount was substantially equal to that in example 9.

Substantially the whole of reduction products from carbon dioxide was carbon monoxide. In conclusion, it was verified that the use of gold for the cathode selectively produces carbon monoxide.

In the case of using, as the cathode, a silver plate instead of the gold plate, it was also verified that carbon monoxide was selectively produced with a high efficiency.

Example 16

The same process as in example 9 was performed except that as the light-concentrating device, a convex lens or a concave mirror was used instead of the Fresnel lens.

As a result, it was verified that in spite of the light-concentrating manner, the reaction current was increased dependently on the energy density of the concentrated sunlight so that the reaction production amount of carbon dioxide obtained per unit period was increased.

Example 17

The same process as in example 9 was performed except that the anode was changed to an anode formed in the manner that the Al proportion (value x) in the $Al_xGa_{1-x}N$ layer, which constituted the first semiconductor layer, was 0, that is, an anode in which a GaN layer and an n-GaN layer were stacked onto each other.

As a result, it was verified that the amount of the sunlight absorbable into the anode was increased so that the production amount of formic acid was increased per unit period.

Example 18

The same processes as in example 10 were performed except that the anode was changed to respective anodes formed while the Al proportion (value x) in the $Al_xGa_{1-x}N$ layer, which constituted the first semiconductor layer, was varied from 0 to 0.25, that is, respective anodes in each of which one out of AlGaN layers different from each other in Al proportion, and an n-GaN layer were stacked onto each other.

As a result, as the value x was smaller, the amount of the sunlight absorbable into the anode was increased so that the reaction current amount was increased. However, the proportion of produced hydrocarbons such as methane and ethylene, and alcohols such as ethanol, was decreased. On the other hand, as the value x was made larger, the reaction current amount was somewhat decreased but the reaction potential was heightened. Thus, it was verified that the proportion of produced hydrocarbons and alcohols was increased. In conclusion, as to these organic substances as reaction products, it is preferred that the Al proportion (value x) in the $Al_xGa_{1-x}N$ layer, which constitutes the first semiconductor layer, satisfies: $0.05 \leq x \leq 0.15$.

As described above, it was found out that when a carbon dioxide reducing apparatus is used which has a carbon dioxide reducing cell having, as a constituent element, an anode having a stacked structure composed of a first semiconductor layer made of a nitride semiconductor and a second semiconductor layer having a pn junction structure, a sun tracking device, and a light-concentrating device, the reaction current amount of the cell is increased by irradiating the anode with sunlight.

It was also verified that by optical energy generated in the anode, carbon dioxide is reduced on the cathode.

It was found out that the use of indium for the cathode selectively produces formic acid as a reduction product from carbon dioxide.

It was also found out that the use of gold or silver for the cathode selectively produces carbon monoxide as a reduction product from carbon dioxide.

It was also found out that the use of copper for the cathode selectively produces, as reduction products from carbon dioxide, hydrocarbons as gas components and alcohols as liquid components with a high efficiency.

The present disclosure provides a carbon dioxide reducing method using light, a carbon dioxide reducing cell, and a carbon dioxide reducing apparatus.

What is claimed is:

1. A carbon dioxide reducing method, comprising:
   (a) preparing a carbon dioxide reducing cell including:
      a cathode chamber that holds a first electrolytic solution containing carbon dioxide;
      an anode chamber that holds a second electrolytic solution;
      a proton exchange membrane inserted between the cathode chamber and the anode chamber;
      a cathode set inside the cathode chamber to contact the first electrolytic solution and, the cathode having at least one selected from a group including copper, gold, silver and indium, respective alloys of these elements, and respective metal compounds of these elements on a surface of the cathode; and
      an anode set inside the anode chamber to contact the second electrolytic solution, the anode having a first semiconductor layer constituted by a nitride semiconductor comprising an $Al_xGa_{1-x}N$ layer wherein $0 \leq x \leq 0.25$, and an n-type GaN layer, and a second semiconductor layer constituted by a semiconductor having a pn junction structure and electrically connected to the first semiconductor layer through its p-type semiconductor layer, and further the anode being electrically connected to the cathode through no external power source; and
   (b) irradiating the anode with light to reduce carbon dioxide contained in the first electrolytic solution on the cathode.

2. The carbon dioxide reducing method according to claim 1, wherein in the course of irradiating step (b), the anode is irradiated with light having a wavelength of 365 nm or less, and light having a wavelength of 365 nm or more.

3. The carbon dioxide reducing method according to claim 1, wherein in the course of preparing step (a), the value x in the $Al_xGa_{1-x}N$ layer, which constitutes the first semiconductor layer, is set from 0.05 or more to 0.15 or less.

4. The carbon dioxide reducing method according to claim 1, wherein in the course of preparing step (a), the n-type GaN, which constitutes the first semiconductor layer, is of an $n^+$-type.

5. The carbon dioxide reducing method according to claim 1, wherein in the course of preparing step (a), the semiconductor having the pn junction, which constitutes the second semiconductor layer, is silicon or gallium arsenic.

6. The carbon dioxide reducing method according to claim 1, wherein in the course of preparing step (a), the $Al_xGa_{1-x}N$ layer is at least partially coated with fine particles of nickel oxide.

7. The carbon dioxide reducing method according to claim 1, wherein in the course of preparing step (a), the first electrolytic solution is any one selected from a group including an aqueous potassium bicarbonate solution, an aqueous sodium bicarbonate solution, an aqueous potassium chloride solution, and an aqueous sodium chloride solution.

8. The carbon dioxide reducing method according to claim 1, wherein in the course of preparing step (a), the second electrolytic solution is an aqueous sodium hydroxide solution.

9. The carbon dioxide reducing method according to claim 1, wherein in the course of irradiating step (b), the carbon dioxide reducing cell is positioned at normal temperature under the atmospheric pressure.

10. The carbon dioxide reducing method according to claim 1, wherein in the course of irradiating step (b), the anode is irradiated with sunlight.

11. The carbon dioxide reducing method according to claim 10, comprising, before the irradiating step (b), (c) preparing a sun tracking device including:
a stand section that fixes the carbon dioxide reducing cell;
a driving section that changes the facing direction of the carbon dioxide reducing cell; and
a control section that controls the facing direction of the carbon dioxide reducing cell in accordance with the movement of the sun,
wherein the sun tracking device is a device in which through the control section, the driving section moves the stand section to allow a front surface region of the anode of the carbon dioxide reducing cell to face to sun.

12. The carbon dioxide reducing method according to claim 10, wherein in the irradiating step (b), a light-concentrating device for concentrating sunlight is used to concentrate sunlight, and then the anode is irradiated with the concentrated sunlight.

13. The carbon dioxide reducing method according to claim 12, wherein in the course of irradiating step (b), the light is concentrated by the light-concentrating device as having an intensity of from 200 mW/cm$^2$ or more to 10 W/cm$^2$ or less.

14. The carbon dioxide reducing method according to claim 1, wherein in the irradiating step (b), the anode is irradiated with light to reduce carbon dioxide contained in the first electrolytic solution on the cathode, thereby converting the carbon dioxide to an organic sub stance.

15. The carbon dioxide reducing method according to claim 14, wherein in the irradiating step (b), the carbon dioxide is reduced to yield at least one of carbon monoxide, formic acid, methane, ethylene, methanol, ethanol, isopropanol, and allyl alcohol.

16. A carbon dioxide reducing cell for reducing carbon dioxide using light, comprising:
a cathode chamber that holds a first electrolytic solution containing carbon dioxide;
an anode chamber that holds a second electrolytic solution;
a proton exchange membrane inserted between the cathode chamber and the anode chamber;
a cathode that is set inside the cathode chamber to contact the first electrolytic solution, and the cathode having any one selected from a group including copper, gold, silver and indium, respective alloys of these elements, and respective metal compounds of these elements on a surface of the cathode; and
an anode that is set inside the anode chamber to contact the second electrolytic solution, the anode having a first semiconductor layer constituted by a nitride semiconductor comprising an $Al_xGa_{1-x}N$ layer wherein $0 \le x \le 0.25$, and an n-type GaN layer, and a second semiconductor layer constituted by a semiconductor having a pn junction structure and electrically connected to the first semiconductor layer through its p-type semiconductor layer, and further the anode being electrically connected to the cathode through no external power source.

17. A carbon dioxide reducing apparatus, comprising:
the carbon dioxide reducing cell according to claim 16; and
a sun tracking device that synchronizes a change in the facing direction of the carbon dioxide reducing cell with the movement of the sun to allow a front surface region of the anode to face to the sun, wherein the sun tracking device includes:
a stand section that fixes the carbon dioxide reducing cell;
a driving section that changes the facing direction of the carbon dioxide reducing cell; and
a control section that controls the facing direction of the carbon dioxide reducing cell in accordance with the movement of the sun,
wherein the sun tracking device is a device in which through the control section, the driving section moves the stand section to allow the front surface region of the anode of the carbon dioxide reducing cell to face to sun.

18. The carbon dioxide reducing apparatus according to claim 17, further comprising a light-concentrating device for concentrating sunlight to irradiate a predetermined surface region of the anode with the concentrated sunlight.

19. The carbon dioxide reducing apparatus according to claim 18, wherein the light-concentrating device is any of a biconcave mirror, a planoconvex lens, and a Fresnel lens.

20. The carbon dioxide reducing apparatus according to claim 18, wherein the light-concentrating device is a concave mirror.

* * * * *